US011692368B2

(12) United States Patent
Currie

(10) Patent No.: US 11,692,368 B2
(45) Date of Patent: Jul. 4, 2023

(54) MEMORIAL VASE COVER AND ORNAMENT KIT

(71) Applicant: Tina S. Currie, Harrisburg, NC (US)

(72) Inventor: Tina S. Currie, Harrisburg, NC (US)

(*) Notice: Subject to any disclaimer, the term of this patent is extended or adjusted under 35 U.S.C. 154(b) by 375 days.

(21) Appl. No.: 17/014,949

(22) Filed: Sep. 8, 2020

(65) Prior Publication Data
US 2021/0071439 A1    Mar. 11, 2021

Related U.S. Application Data

(60) Provisional application No. 62/896,544, filed on Sep. 5, 2019.

(51) Int. Cl.
*E04H 13/00* (2006.01)
*A47G 7/07* (2006.01)

(52) U.S. Cl.
CPC ............ *E04H 13/001* (2013.01); *A47G 7/07* (2013.01)

(58) Field of Classification Search
USPC ....... 47/41.11, 41.01, 41.1, 41.12, 41.14, 47, 47/66.6; D11/143, 144, 150, 160
See application file for complete search history.

(56) References Cited

U.S. PATENT DOCUMENTS

| | | | | |
|---|---|---|---|---|
| 1,712,986 A * | 5/1929 | Favata, Jr. | ............... | A01G 9/02 248/153 |
| 2,734,312 A * | 2/1956 | Vaghi | ....................... | A47G 7/06 47/41.01 |
| 2,876,587 A * | 3/1959 | Saks | .................... | F21V 33/0028 D11/144 |
| 3,784,136 A * | 1/1974 | Lopez | .................... | A47G 33/12 47/40.5 |
| 4,775,060 A * | 10/1988 | Pinney | ............... | A47G 19/2222 220/710 |
| 5,082,699 A * | 1/1992 | Landau | .................... | A47G 7/06 428/34.1 |
| 5,673,789 A * | 10/1997 | Degraff-Eugene | ......................... | A47G 19/2288 206/217 |
| 5,715,954 A * | 2/1998 | Zaremba | ................. | A47B 57/26 220/23.83 |
| 6,453,590 B1 * | 9/2002 | Burke | ..................... | G09F 17/00 40/538 |

(Continued)

FOREIGN PATENT DOCUMENTS

| | | | | |
|---|---|---|---|---|
| CN | 2154728 Y | * | 2/1994 | ............. A63H 15/06 |
| CN | 2003-304964 | * | 10/2003 | ............. A47G 21/00 |

(Continued)

*Primary Examiner* — Andrea M Valenti
(74) *Attorney, Agent, or Firm* — Jeffrey C. Watson; Grell & Watson Patent Attorneys LLC

(57) ABSTRACT

A memorial vase cover and ornament kit includes a lid and a rod. The lid is configured to fit on a memorial vase and seal an open top of the memorial vase. The lid has a rod hole through a center of the lid configured to receive a rod. The rod is configured to extend from approximate a bottom of the memorial vase, through the rod hole in the lid positioned on the open top of the memorial vase and upwards above the lid for a set distance to hold a base ornament on the lid. Wherein, the memorial vase cover and ornament kit is configured to cover and seal the open top of the memorial vase and to allow the memorial vase to be decorated with the base ornament.

17 Claims, 22 Drawing Sheets

(56) References Cited

U.S. PATENT DOCUMENTS

| | | | | |
|---|---|---|---|---|
| 6,715,622 | B2* | 4/2004 | Keenan | A47F 7/0071 |
| | | | | 211/205 |
| 7,793,462 | B1* | 9/2010 | Sherette | A47G 7/06 |
| | | | | 428/34.1 |
| 8,196,343 | B1* | 6/2012 | McGuire | A01G 5/04 |
| | | | | 47/41.01 |
| 9,307,851 | B1* | 4/2016 | Rhodes | A47G 21/182 |
| D781,651 | S* | 3/2017 | Matthis | D7/517 |
| D813,584 | S* | 3/2018 | Ludwig | D7/300.2 |
| 10,165,882 | B1* | 1/2019 | Rhodes | A47G 21/18 |
| 10,602,685 | B2* | 3/2020 | Eckert | A01G 27/06 |
| 2005/0138861 | A1* | 6/2005 | O'Connor | A47G 7/07 |
| | | | | 47/41.12 |
| 2012/0205389 | A1* | 8/2012 | Beary | A47G 19/2222 |
| | | | | 220/710 |
| 2012/0247998 | A1* | 10/2012 | Wahl | B65D 77/0486 |
| | | | | 206/459.5 |
| 2015/0265078 | A1* | 9/2015 | Goosman | A47G 19/2222 |
| | | | | 220/707 |

FOREIGN PATENT DOCUMENTS

| | | | | |
|---|---|---|---|---|
| CN | 101432199 A | * | 5/2009 | B65D 33/02 |
| JP | 2017-205360 | * | 11/2017 | A47G 21/00 |

* cited by examiner

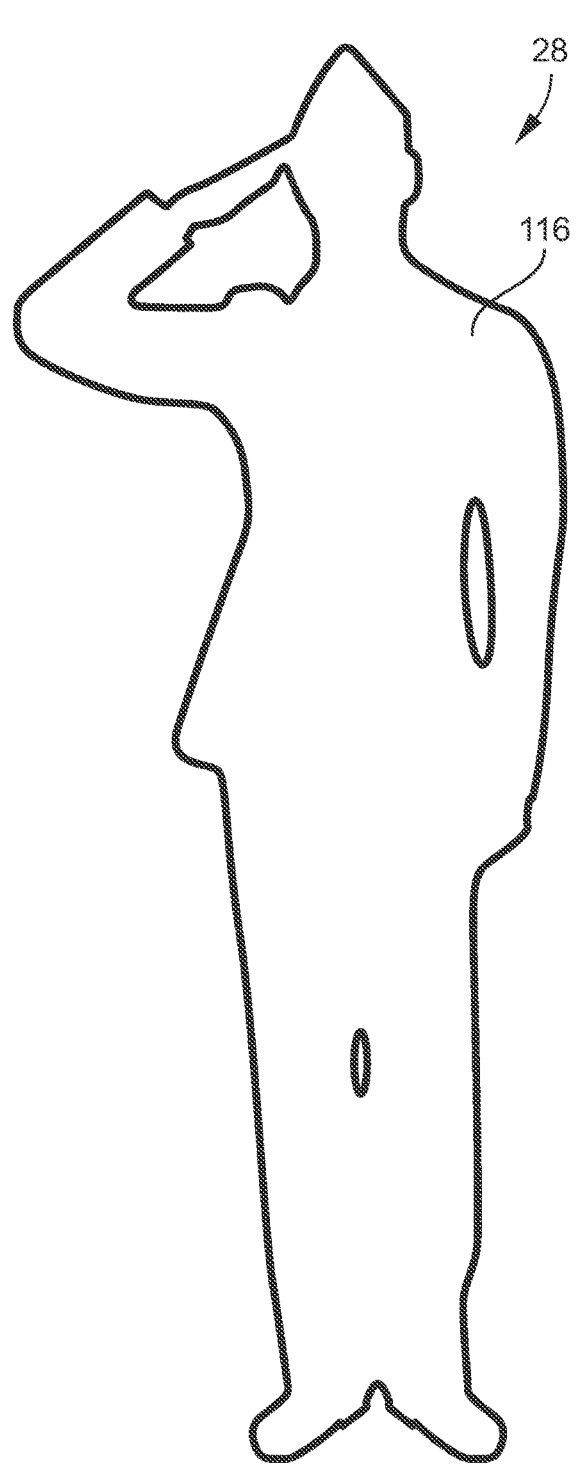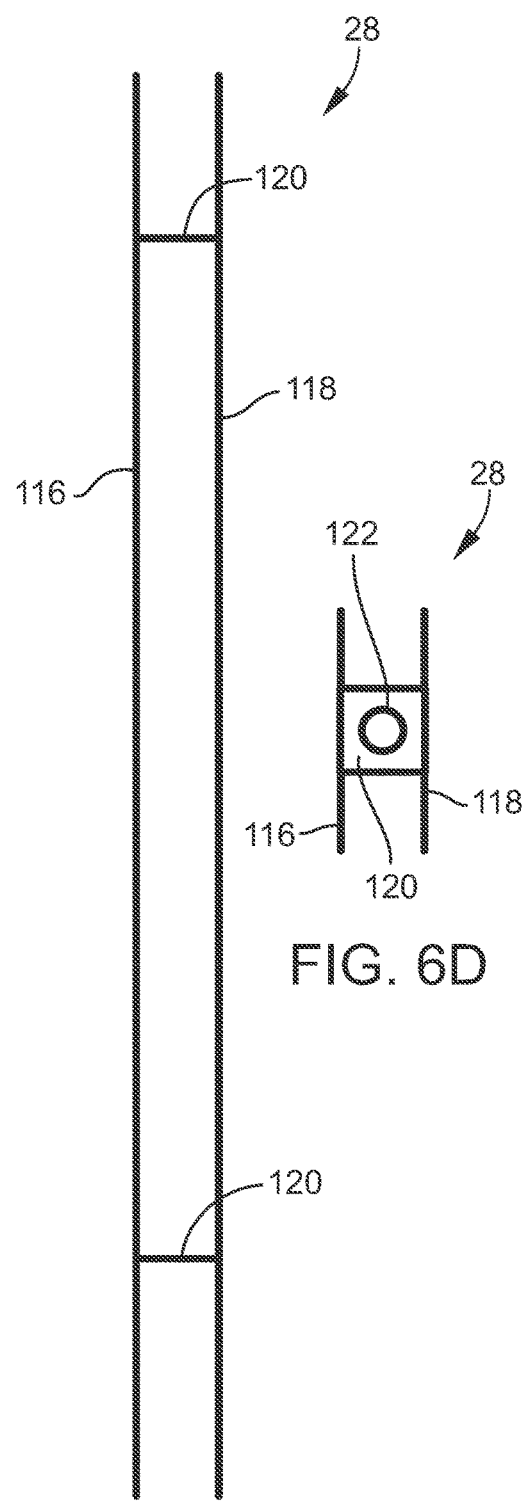
FIG. 6B
FIG. 6C
FIG. 6D

MEMORIAL VASE COVER AND ORNAMENT KIT

CROSS-REFERENCE TO RELATED APPLICATIONS

This application claims the priority benefit of U.S. Provisional Application No. 62/896,544, filed on Sep. 5, 2019, entitled "Memorial vase cover and ornament kit", which is incorporated by reference herein in its entirety.

FIELD OF THE DISCLOSURE

The present disclosure relates to a device of a lid and rod that fits memorial vase and allows for a placement of ornaments and accessories. The device will provide a leak proof cover for vase and a stronger weather resistance display.

BACKGROUND

Generally speaking, a cemetery or graveyard is a place where the remains of dead people are buried or otherwise interred. The intact or cremated remains of people may be interred in a grave, commonly referred to as burial, or in a tomb, an "above-ground grave" (resembling a sarcophagus), a mausoleum, columbarium, niche, or other edifice. In Western cultures, funeral ceremonies are often observed in cemeteries. These ceremonies or rites of passage differ according to cultural practices and religious beliefs.

Typically, lawn cemeteries comprise a number of graves in a lawn setting with trees and gardens on the perimeter. While aesthetic appeal to family members has been the primary driver for the development of lawn cemeteries, cemetery authorities initially welcomed this new style of cemetery enthusiastically, expecting easier maintenance. Unfortunately, in practice, while families are often initially attracted to the uncluttered appearance of a lawn cemetery, the practice of placing flowers around the grave site or in a vase or memorial vase is very common and requires extra care and maintenance to clean up. In addition, other items like small toys on children's graves, re-introduces some clutter to the cemetery and makes it difficult to maintain the lawn cemetery. While cemetery authorities increasingly impose restrictions on the nature and type of objects that can be placed on lawn graves and actively remove prohibited items, grieving families are often unwilling to comply with these restrictions and become very upset if the items are removed. As such, there is clearly a need to provide a means and or mechanisms for decorating a grave site that requires less maintenance or clean up.

Another problem with these vases or memorial vases used on grave sites is that they are typically exposed to the elements. This leads to the vase being filled with moisture and other objects from the environment, like grass clippings from the lawn cemetery being mowed. As a result, when the memorial vase fills with water and/or other objects it can push the flowers or other objects inserted into the memorial vase out of the memorial vase and/or cause damage to the flowers or other objects inserted therein. As such, there is clearly a need to seal these memorial vases to keep them clean.

In addition, the instant disclosure recognizes that common flowers used to decorate grave sites become weather damaged over a short period of time and fade out of their color. As such, an alternative means or devices for decorating a grave site is needed or desired.

The instant disclosure may be designed to address at least certain aspects of the problems or needs discussed above by providing a memorial vase cover and ornament kit.

SUMMARY

Accordingly, in one aspect, the present disclosure embraces a memorial vase cover and ornament kit. The memorial vase cover and ornament kit may generally include a lid and a rod. The lid may be configured to fit on a memorial vase and seal an open top of the memorial vase. The lid may have a rod hole through a center of the lid configured to receive a rod. The rod may be configured to extend from approximate a bottom of the memorial vase, through the rod hole in the lid positioned on the open top of the memorial vase, and upwards above the lid for a set distance to hold a base ornament on the lid. Wherein, the memorial vase cover and ornament kit may be configured to cover and seal the open top of the memorial vase and to allow the memorial vase to be decorated with the base ornament.

In select embodiments of the disclosed memorial vase cover and ornament kit, the lid may have a circular shape. In this embodiment, the circular shape of the lid may be sized and configured for a lip of the open top of the memorial vase. Where the circular shape may be sized to position the lid on the lip of the open top of the memorial vase.

In select embodiments of the disclosed memorial vase cover and ornament kit, the rod hole may include a rubber stopper. The rubber stopper may be configured to seal the rod to the rod hole in the lid.

One feature of the disclosed memorial vase cover and ornament kit may be the inclusion of a rod cap. The rod cap may be configured to be attached to a top end of the rod. The rod cap may thus be configured to keep the base ornament on the rod. In select embodiments, the rod may include a threaded portion at the top end of the rod and the rod cap may include a threaded interior configured to attach the rod cap to the threaded portion at the top end of the rod. Whereby the rod cap may be screwed on and off of the top end of the rod.

Another feature of the disclosed memorial vase cover and ornament kit may be the inclusion of a weight. The weight may be positioned on the rod below the lid. The weight may be configured to securely position the lid on top of the open top of the memorial vase. In select embodiments, the weight may have a doughnut shape with a tapered bottom edge. The tapered bottom edge of the doughnut shape may be configured to allow the weight to be positioned on a tapered interior of the memorial vase. In other select embodiments, the weight may be positioned below the lid via a plurality of prongs. The prongs may be attached to a bottom surface of the lid, extend around the weight, and attach to the rod below the weight. Whereby, the prongs may be configured for holding the weight below the lid.

In select embodiments of the disclosed memorial vase cover and ornament kit, the base ornament may include a plurality of hoops. The hoops may be attached to a back side of the base ornament. The plurality of hoops may be configured and shaped to go around the rod and position the base ornament on top of the lid.

In select embodiments of the disclosed memorial vase cover and ornament kit, the base ornament may include a front member, a back member, and at least one connecting member. The connecting member(s) may be connected between the front member and the back member. Each of the at least one connecting members may include a connecting member hole configured to receive the rod for positioning the base ornament on top of the lid.

Another feature of the disclosed memorial vase cover and ornament kit may be the inclusion of an orientation projection. The orientation projection may be on a top surface of the lid behind the rod. The orientation projection on the top surface of the lid may be configured for orienting the base ornament on the rod and maintaining the orientation of the base ornament to face a front of the memorial vase.

Another feature of the disclosed memorial vase cover and ornament kit may be the inclusion of at least one side attachment. The side attachment or attachments may be on the top surface of the lid. Each of the at least one side attachments may be configured for attaching a side ornament. In select embodiments, the lid may include two side attachments, a first side attachment on a first side of the top surface of the lid, and a second side attachment on a second side of the top surface of the lid. In other select embodiments, each of the at least one side attachments may include a slide hook tab. The slide hook tab may be connected to the top surface of the lid. Each of the slide hook tabs may include an indention configured to receive a protrusion connected to the side ornament. Wherein, when the protrusion of the side ornament is inserted under the slide hook tab and into the indention of the slide hook tab, the slide hook tab is configured to lock the side ornament in place on the top surface of the lid.

Another feature of the disclosed memorial vase cover and ornament kit may be the inclusion of an outer skirt. The outer skirt may be configured for decorating a top portion of the memorial vase. The outer skirt may hang down from a periphery of the lid. In select embodiments, the outer skirt may have a fixed shaped with a flat periphery. This fixed shaped may be designed and configured to fit any desired memorial vase. In other select embodiments, the outer skirt may also be configured to bend and fit tight around the top portion of the memorial vase. Whereby the outer skirt may be configured to maintain the lid in position on the open top of the memorial vase.

Another feature of the disclosed memorial vase cover and ornament kit may be the inclusion of a flower holder. The flower holder may be configured to hold flowers on an outside of the memorial vase. In select embodiments, the flower holder may include a c-shaped surface configured to extend around a back side of the memorial vase. In this c-shaped embodiment, a plurality of tab attachments connected to the c-shaped surface may be configured to attach the c-shaped surface to the lid. A plurality of insert holes may be in the c-shaped surface that can be configured to receive and hold a plurality of the flowers on the outside of the memorial vase. A stem cover may also be included in this embodiment that hangs down around the c-shaped surface configured for concealing stems of the plurality of flowers. In other select embodiments, the flower holder may include a plurality of receptacles. These receptacles may be configured to extend around a back side of the memorial vase and hold the flowers. To position the receptacles in place on the lid, a partial back lip portion may be included that is configured to rest on the back side of the memorial vase. A tongue may also be included to position the receptacles in place on the lid. The tongue may protrude from the partial lip portion and can include a flower holder hole configured to receive the rod. Wherein, the tongue can be inserted onto the rod via the flower holder hole and positioned on top of the lid where the partial back lip portion is resting on the back side of the memorial vase.

In another aspect, the instant disclosure embraces the memorial vase cover and ornament kit in any of the various embodiments and/or combinations of embodiments shown and/or described herein.

In yet another aspect, the instant disclosure embraces a method of sealing and decorating a memorial vase. The disclosed method of sealing and decorating a memorial vase may generally include utilizing the memorial vase cover and ornament kit in any of the various embodiments and/or combinations of embodiments shown and/or described herein. As such, the disclosed method of sealing and decorating a memorial vase may include the step of providing the disclosed memorial vase cover and ornament kit in any of the various embodiments and/or combinations of embodiments shown and/or described herein. With the provided memorial vase cover and ornament kit, the method may further include the steps of: sealing the open top of the memorial vase with the memorial vase cover and ornament kit; and/or decorating the memorial vase with the memorial vase cover and ornament kit.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which:

FIG. 6B is a front side view of the base ornament for the memorial vase cover and ornament kit according to select embodiments of the instant disclosure showing the front surface or the back surface;

FIG. 6C is a side view of the base ornament of FIG. 6B showing the front surface and the back surface connected by two connecting members;

FIG. 6D is a top view or a bottom view of the base ornament of FIG. 6B showing the front surface and the back surface connected by connecting members with a connecting member hole.

Figure 1:
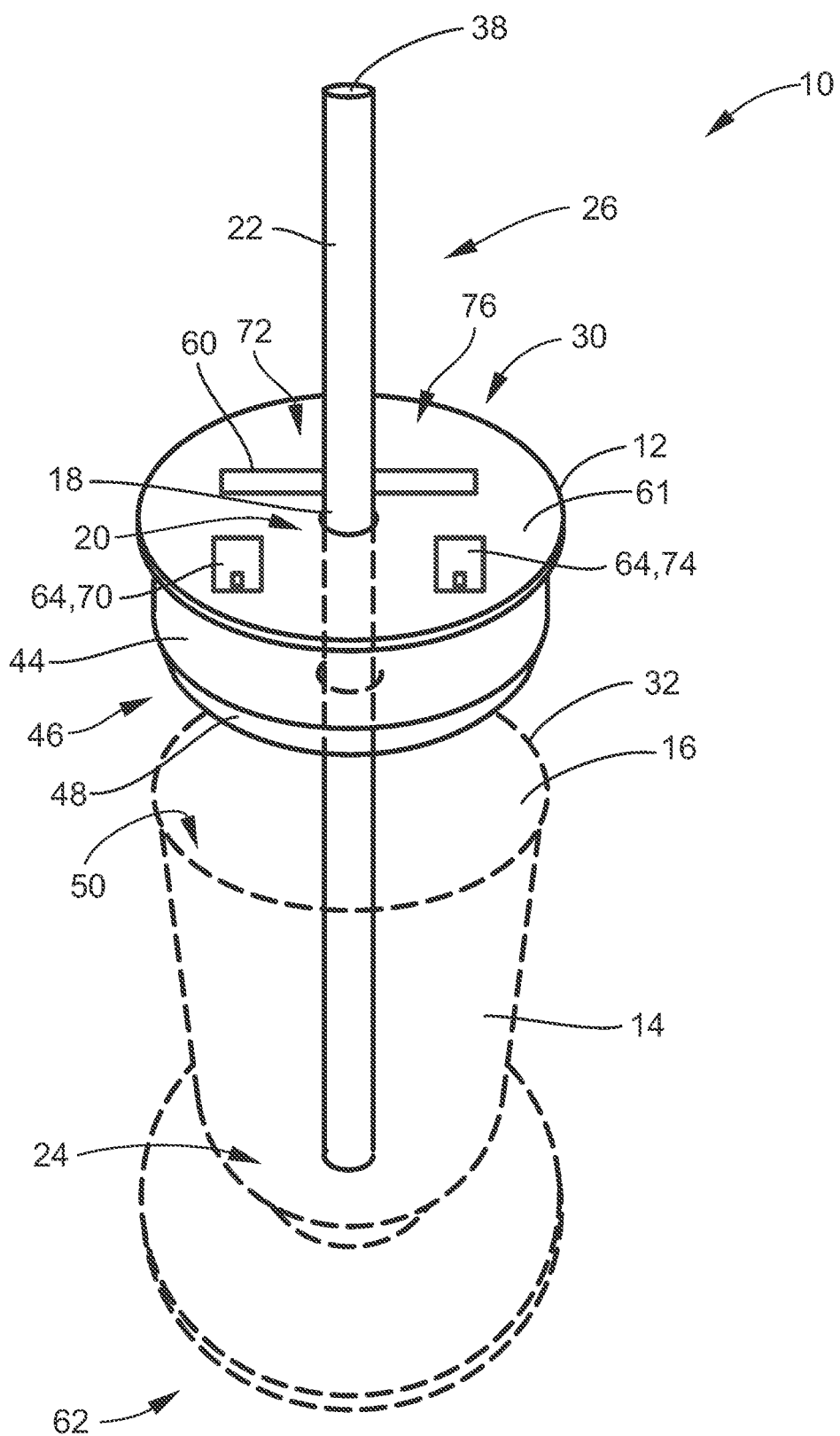
FIG. 1 is a front top perspective view of the memorial vase cover and ornament kit according to select embodiments of the instant disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-22, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Referring now to FIGS. 1-21, the present disclosure solves the aforementioned limitations of the currently available devices and methods of gravesite decorations by providing memorial vase cover and ornament kit 10. Memorial vase cover and ornament kit 10 may be designed to cover and seal memorial vase 14, a standard vase, the like, etc. Memorial vase cover and ornament kit 10 may also be designed and configured to attach decorations or ornaments onto memorial vase 14, a standard vase, the like, etc., including, but not limited to, base ornament 28 (like: a soldier—see FIGS. 5, 6, 11, 16, 18, and 21; carousel—see FIG. 7; cross—see FIG. 17; the like; any other base ornament design, etc.), side ornament 66 (like an eagle—see FIGS. 10, 11, and 16, the like, any other side ornament design, etc.), flowers 92 (see FIGS. 15, 16, 17, and 18), the like, etc., and/or combinations thereof. Memorial vase cover and ornament kit 10 may generally include lid 12 and rod 22. Lid 12 may be configured to fit on memorial vase 14 and seal open top 16 of memorial vase 14. Lid 12 may have rod hole 18 through center 20 of lid 12 configured to receive rod 22. Rod 22 may be configured to extend from approximate bottom 24 of memorial vase 14, through rod hole 18 in lid 12 positioned on open top 16 of memorial vase 14, and upwards above lid 12 for set distance 26 to hold base ornament 28 on lid 12. Set distance 26 may be designed and configured to hold various size and heights of base ornament 28. Wherein, memorial vase cover and ornament kit 10 may be configured to cover and seal open top 16 of memorial vase 14 and/or to allow memorial vase 14 to be decorated with at least base ornament 28.

Lid 12 may be included with memorial vase cover and ornament kit 10. Lid 12 may be designed and configured as a cover, lid, seal, the like, etc. on open top 16 of memorial vase 14, other vases, or the like. Lid 12 may have circular shape 30. However, the disclosure is not so limited, and lid 12 may be provided with any shape or configuration designed to cover and seal memorial vase 14 or the like. In this circular shape 30 embodiment of lid 12, as shown in the Figures, circular shape 30 of lid 12 may be sized and configured for lip 32 of open top 16 of memorial vase 14. Circular shape 30 may thus be sized and configured to position lid 12 on lip 32 of open top 16 of memorial vase 14.

Figure 2:
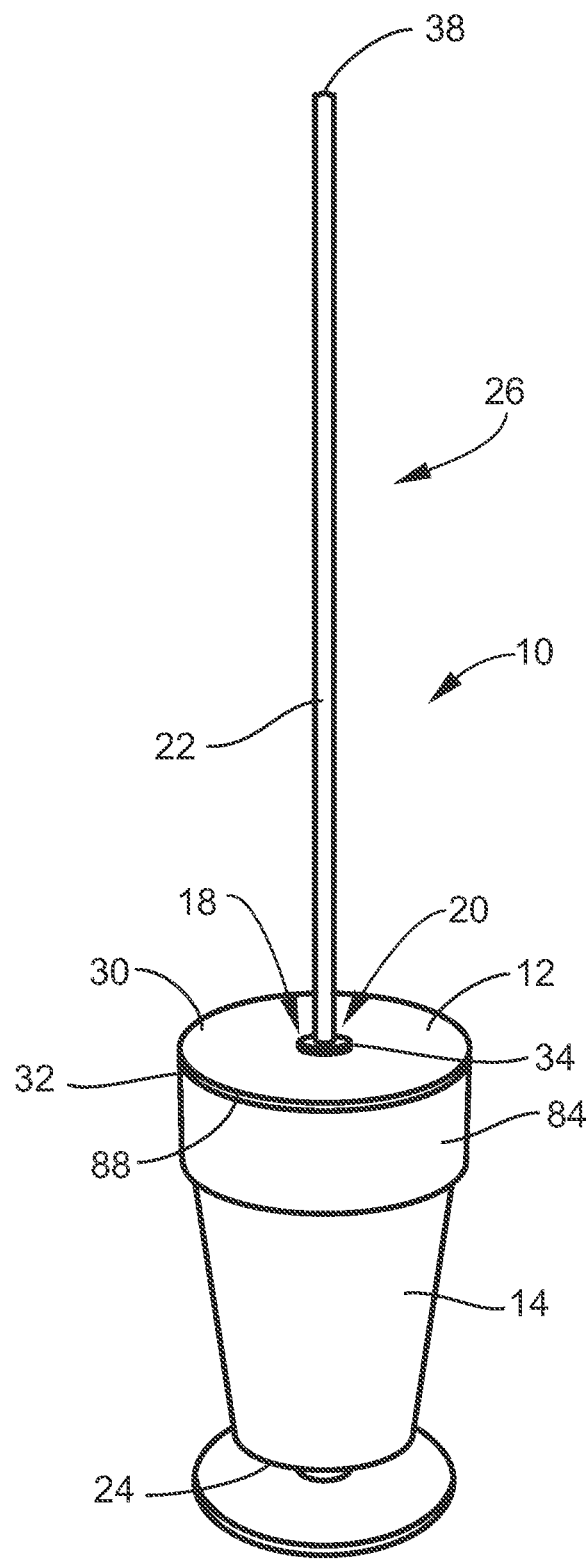
FIG. 2 is a front top perspective view of the memorial vase cover and ornament kit according to select embodiments of the instant disclosure installed on top of a memorial vase with no decorative ornaments attached.
Figure 3:
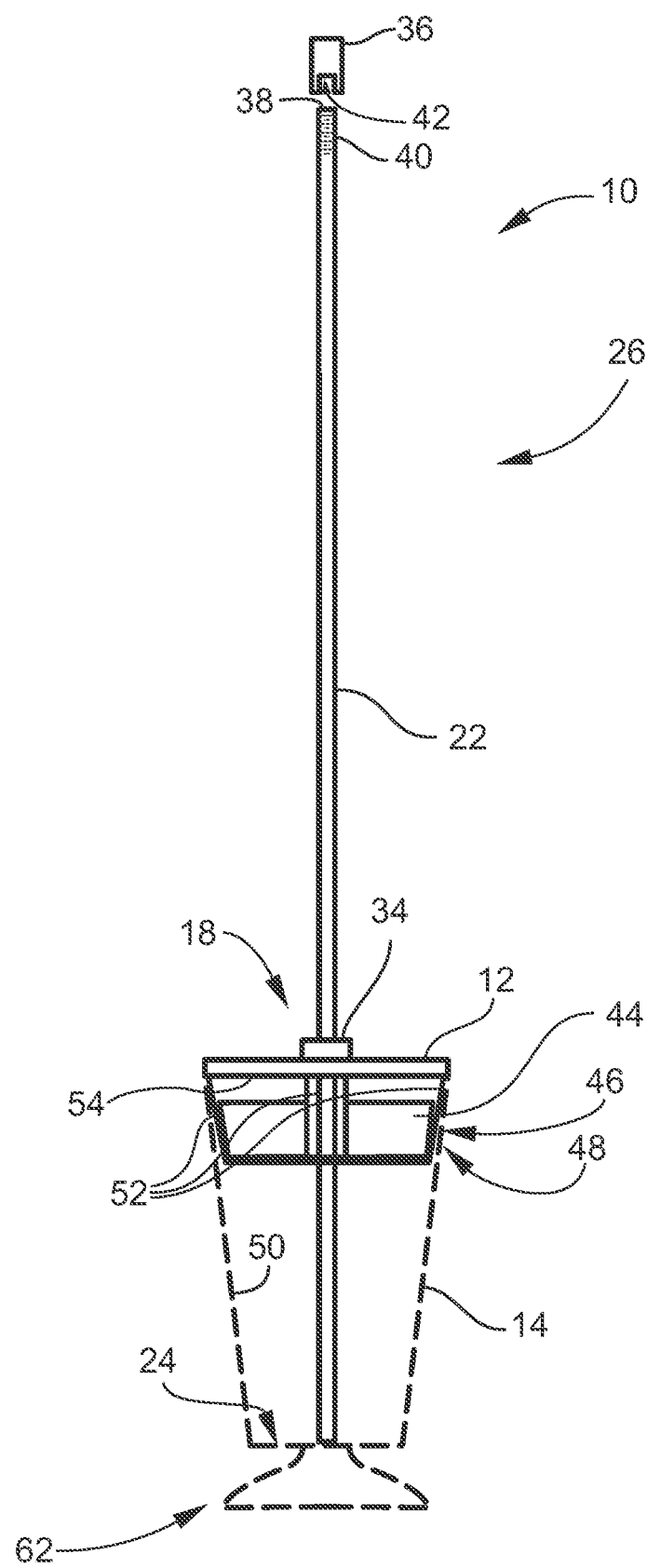
FIG. 3 is a front view of the memorial vase cover and ornament kit according to select embodiments of the instant disclosure installed on top of a memorial vase showing a cross-sectional view through the memorial vase with the rod cap removed.

Referring now specifically to FIGS. 2 and 3, rubber stopper 34 may be included with memorial vase cover and ornament kit 10. Rubber stopper 34 may be designed to seal rod hole 18 on lid 12 to rod 22 inserted therein. Rubber stopper 34 may be any device or means for sealing rod hole 18 on lid 12 to rod 22 inserted therein.

Referring now specifically to FIG. 3, one feature of memorial vase cover and ornament kit 10 may be the inclusion of rod cap 36. Rod cap 36 may be for securing base ornament 28 on rod 22 on top of lid 12. Rod cap 36 may be configured to be attached to top end 38 of rod 22. Rod cap 36 may thus be configured to keep base ornament 28 from being pulled or blown off of top end 38 of rod 22. Rod cap 36 may be secured on top end 38 of rod 22 by any means. In select embodiments, rod 22 may include threaded portion 40 at top end 38 of rod 22 and rod cap 36 may include threaded interior 42 configured to attach rod cap 36 to threaded portion 40 at top end 38 of rod 22. Whereby rod cap 36 may be configured to screwed on and off of top end 38 of rod 22.

Figure 4:
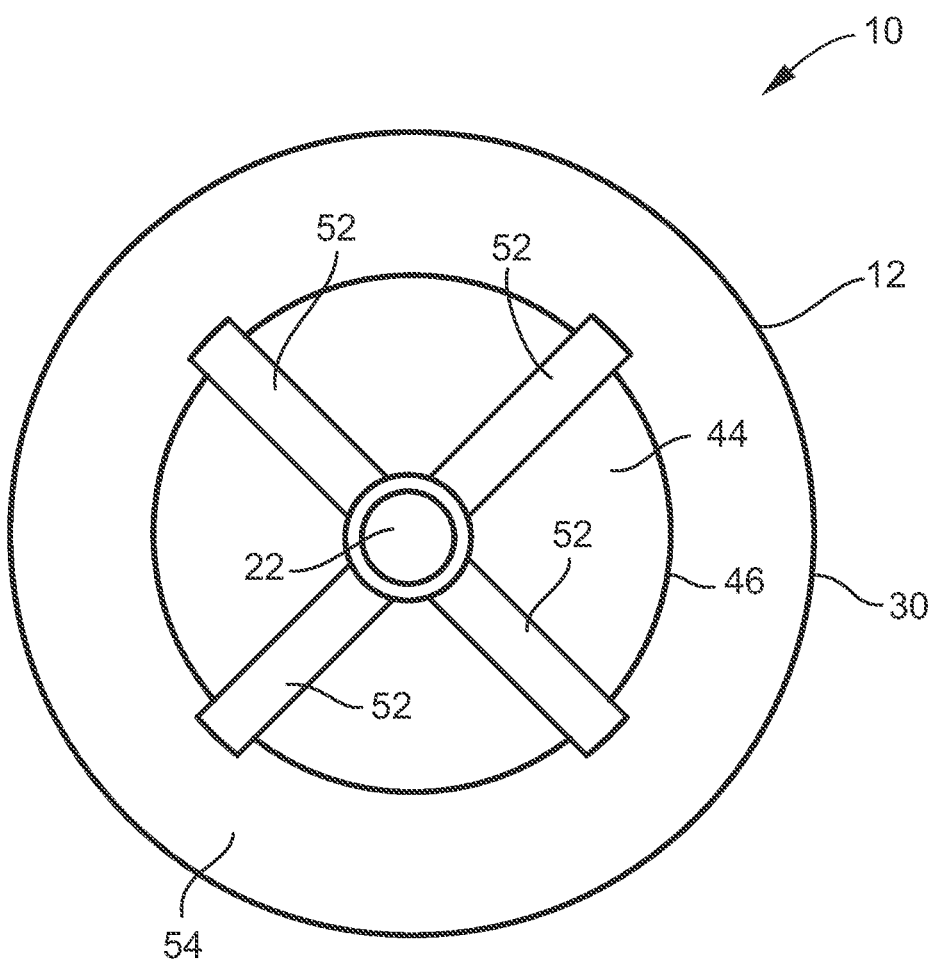
FIG. 4 is a bottom view of the lid for the memorial vase cover and ornament kit according to select embodiments of the instant disclosure showing the weight positioned below the lid and held in place via the prongs.
Figure 5:
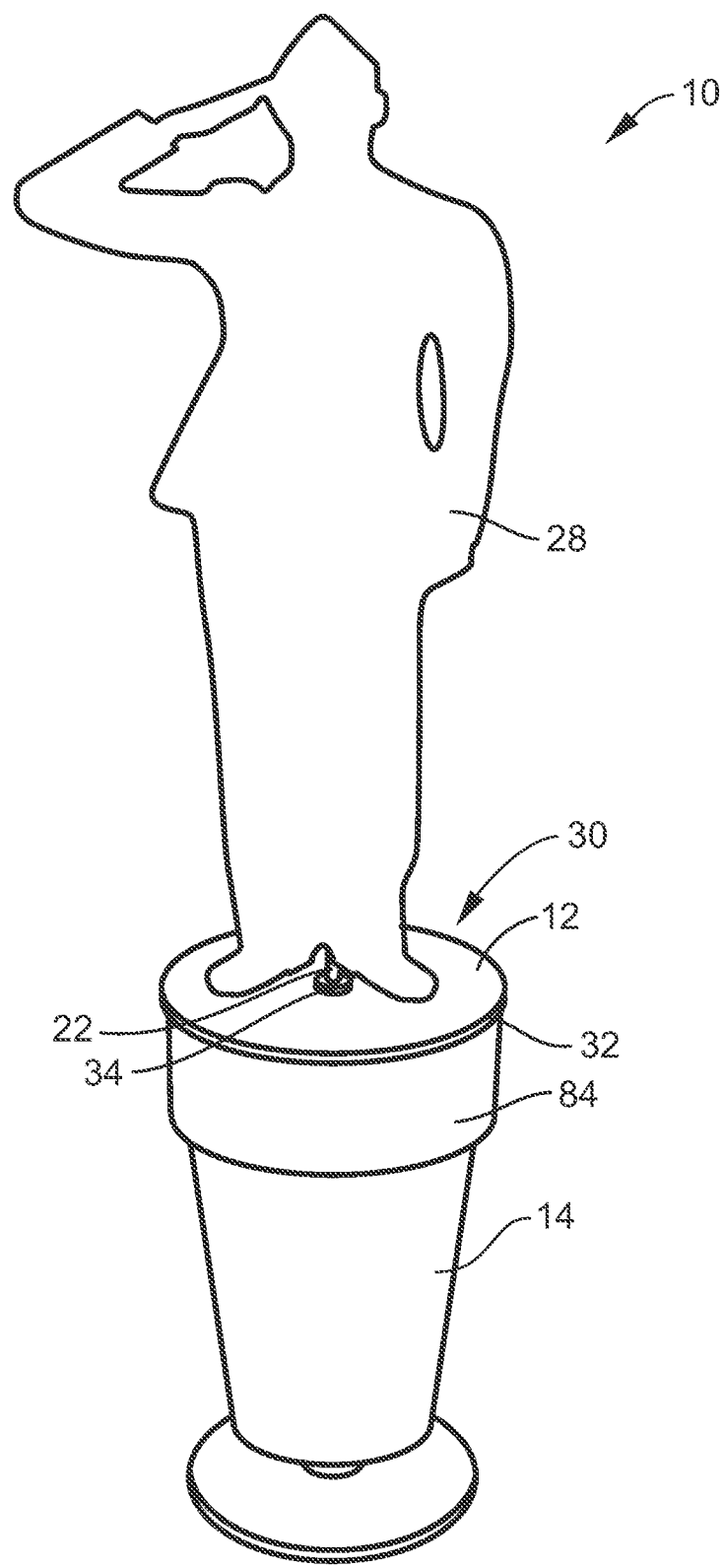
FIG. 5 is a front top perspective view of the memorial vase cover and ornament kit according to select embodiments of the instant disclosure with the base ornament installed on top of the lid, where the base ornament is a soldier design.

Referring now specifically to FIGS. 1, 3 and 4, weight 44 may be included as a feature of memorial vase cover and ornament kit 10. Weight 44 may be configured for maintaining lid 12 on top of open top 16 of memorial vase 14. Weight 44 may be positioned on 22 rod below lid 12. Weight 44 may be configured to securely position lid 12 on top of open top 16 of memorial vase 14. In select embodiments, weight 44 may have doughnut shape 46 with tapered bottom edge 48. Tapered bottom edge 48 of doughnut shape 46 may be configured to allow weight 44 to be positioned on tapered interior 50 of memorial vase 14. In other select embodiments, as best shown in FIGS. 3 and 4, weight 44 may be positioned below lid 12 via a plurality of prongs 52. Prongs 52 may be attached to bottom surface 54 of lid 12, extend around weight 44, and attach to rod 22 below weight 44. Whereby, prongs 52 may be configured for holding weight 44 below lid 12.

Figure 6A:
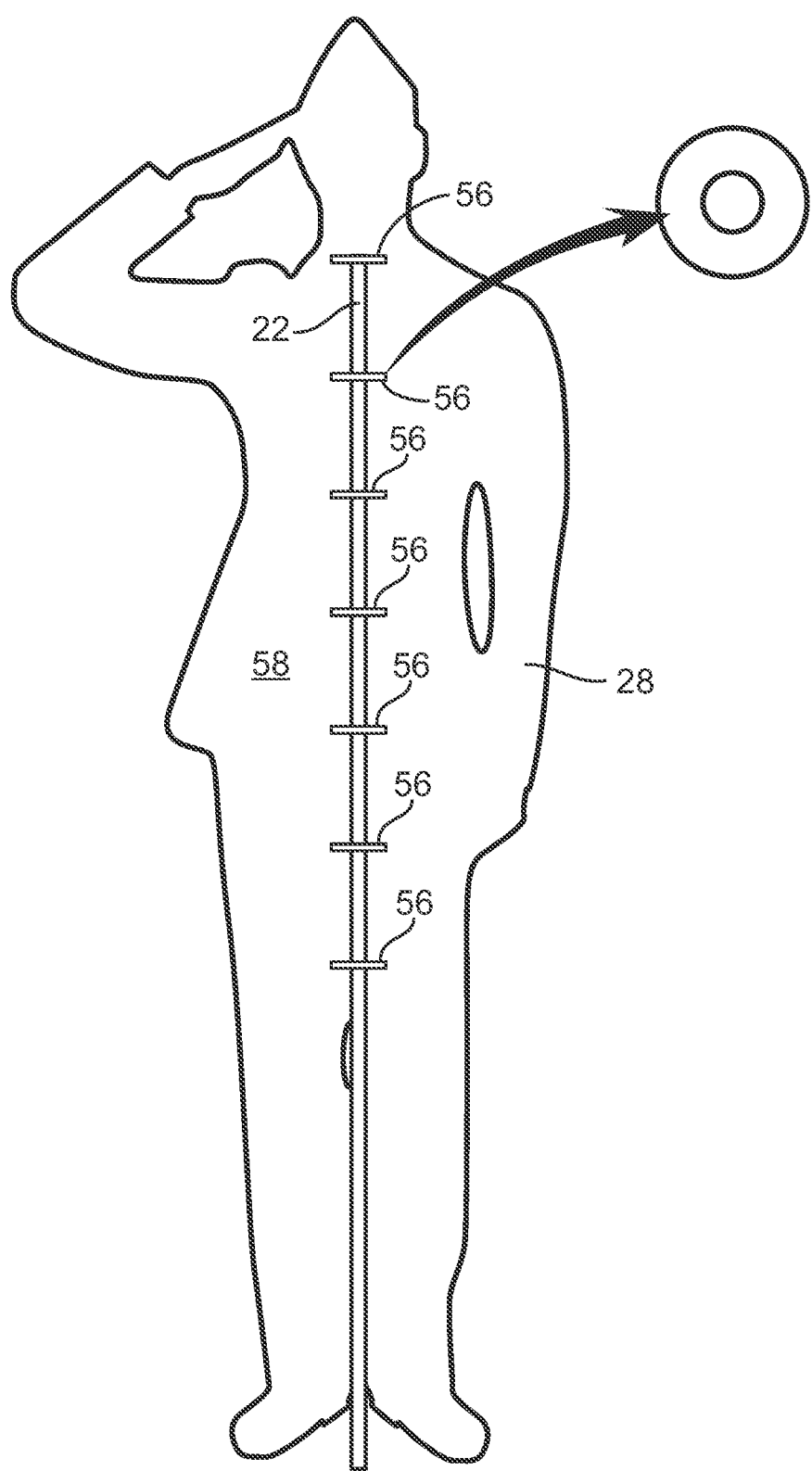
FIG. 6A is a back side view of the base ornament for the memorial vase cover and ornament kit according to select embodiments of the instant disclosure showing the hoops installed on the rod for securing the base ornament on the rod, where the base ornament is a soldier design.
Figure 7:
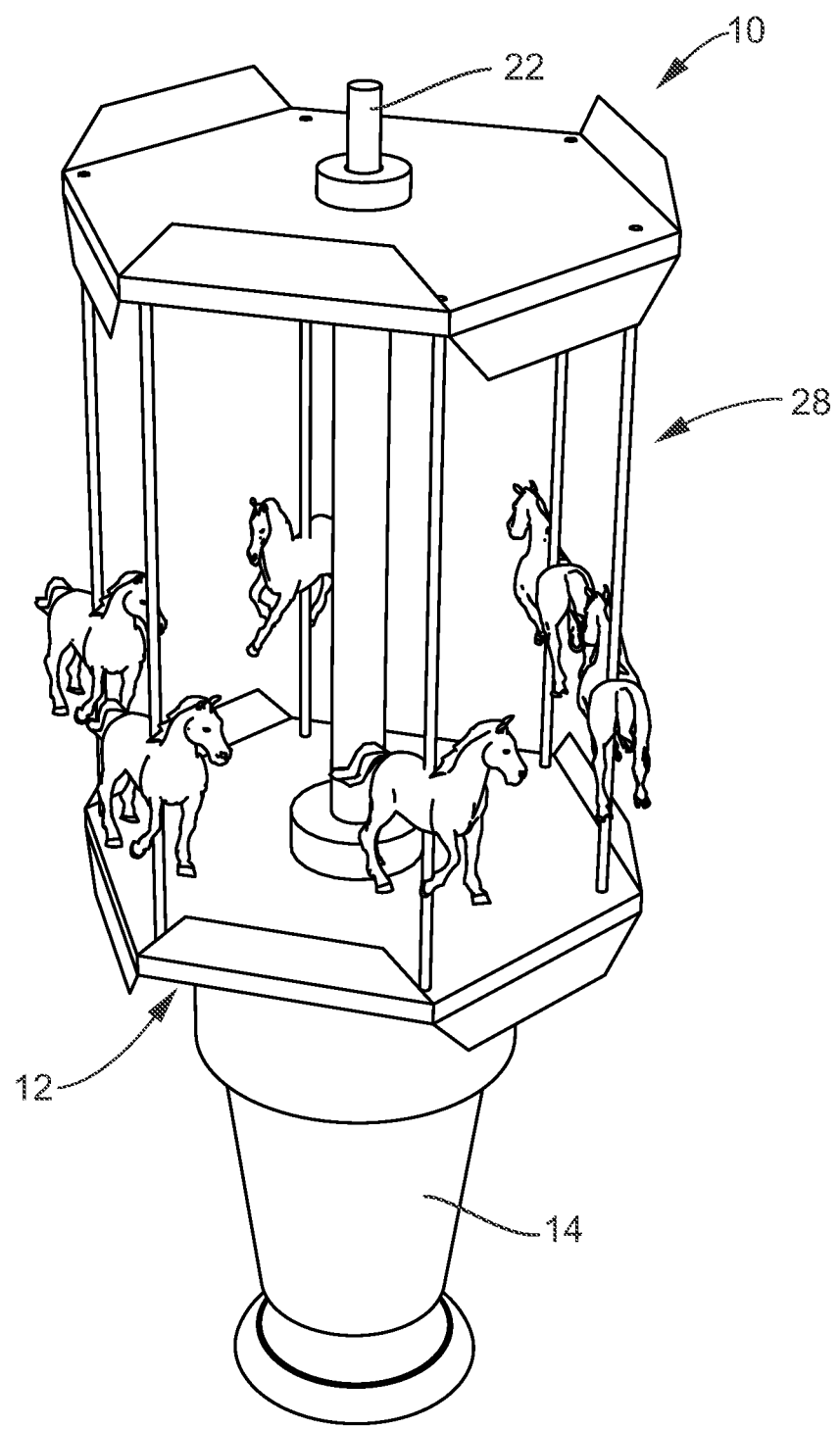
FIG. 7 is a front top perspective view of the memorial vase cover and ornament kit according to select embodiments of the instant disclosure with the base ornament installed on top of the lid, where the base ornament is a carousel design.

Referring now specifically to FIG. 6A, a plurality of hoops 56 may be included on base ornament 28. Hoops 56 may be sized and configured to hold or attach base ornament 28 to rod 22. In select embodiments, hoops 56 may be attached to back side 58 of base ornament 28, as shown in FIG. 6A. The plurality of hoops 56 may be configured and shaped to go around rod 22 and position base ornament 28 on top of lid 12.

Figure 21:
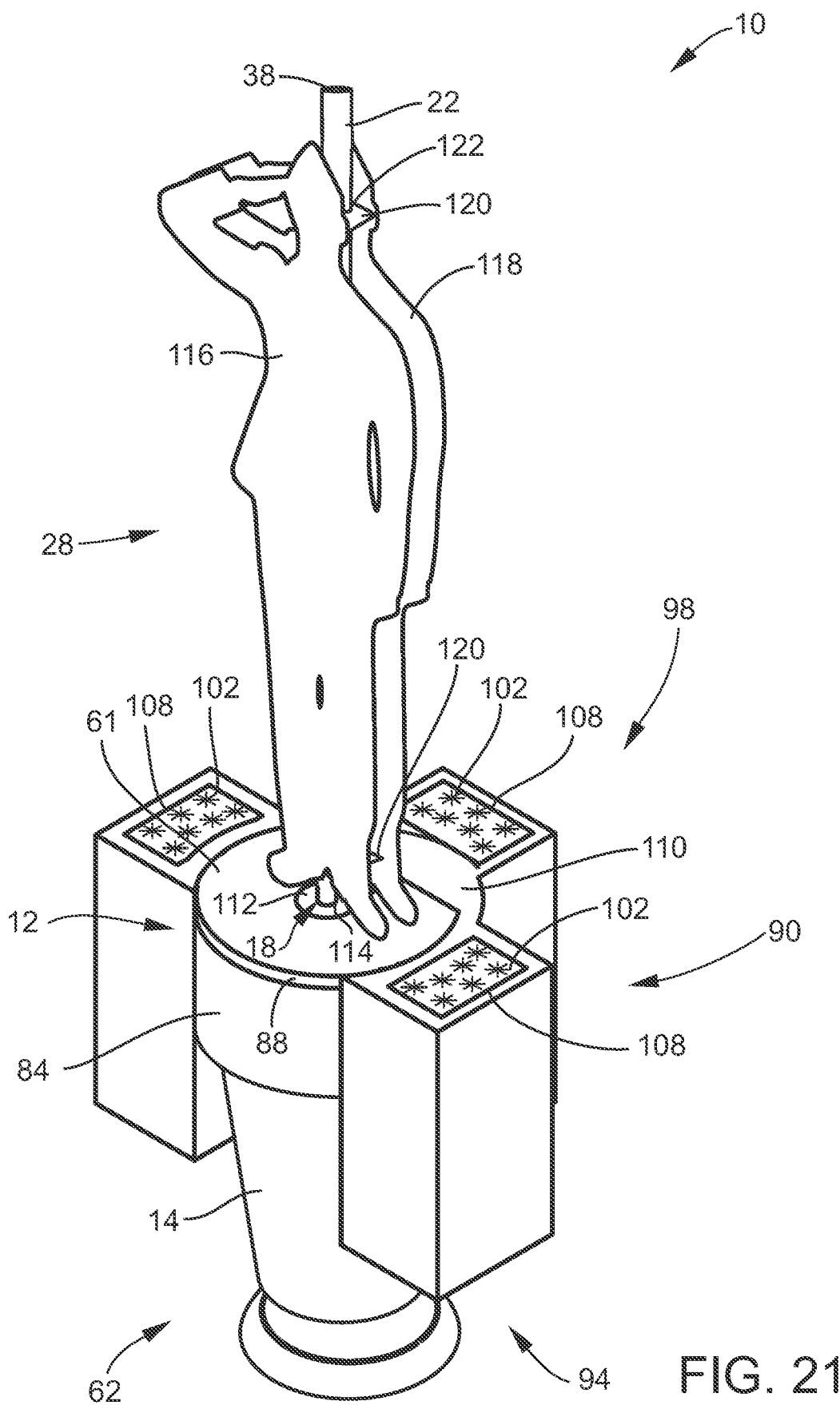
FIG. 21 is a front top perspective view of the memorial vase cover and ornament kit according to select embodiments of the instant disclosure installed on top of a memorial vase with the base ornament of FIGS. 6B-6D attached, and the flower holder of FIGS. 19 and 20 attached.

Referring now specifically to FIGS. 6B, 6C, 6D, and 21, in select embodiments, base ornament 28 may include front member 116, back member 118, and at least one connecting member 120. Connecting member(s) 120 may be connected between front member 116 and back member 118. Each of the at least one connecting members 120 may include connecting member hole 122 configured to receive rod 22 for positioning base ornament 28 on top of lid 12. As best shown in FIG. 6C, base ornament 28 may include a first connecting member 120 positioned approximate the top of base ornament 28 connecting front member 116 to back member 118 approximate their tops, and a second connecting member 120 positioned approximate the bottom of base ornament 28 connecting front member 116 to back member 118 approximate their bottoms. In this embodiment, rod 22 would be inserted through connecting hole 122 approximate the bottom of base ornament 28 and up through connecting hole 122 approximate the top of base ornament 28 for positioning base ornament 28 on top of lid 12. This embodiment is best shown in FIG. 21 where base ornament 28 is inserted on rod 22 through connecting holes 122 approximate the bottom and top of base ornament 28.

Figure 8:
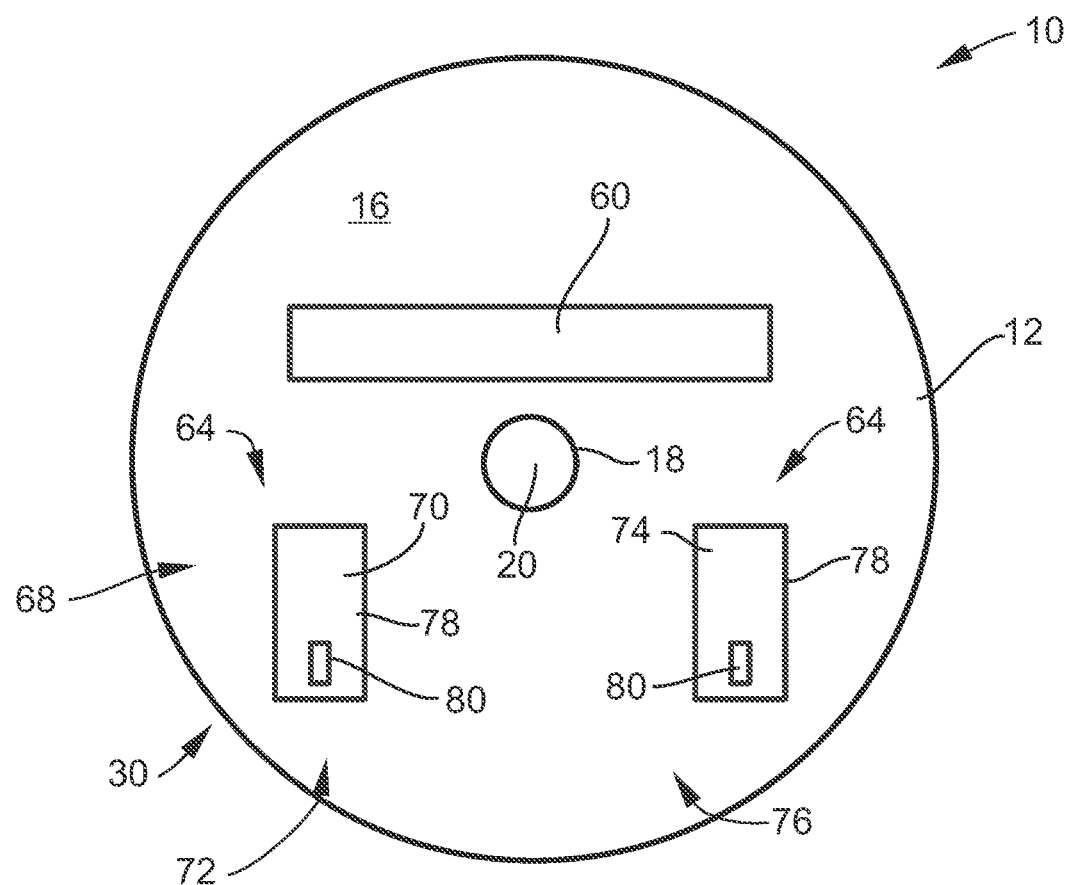
FIG. 8 is a top view of the lid for the memorial vase cover and ornament kit according to select embodiments of the instant disclosure showing the position of the side attachments as well as the orientation projection on the top surface of the lid.
Figure 13:
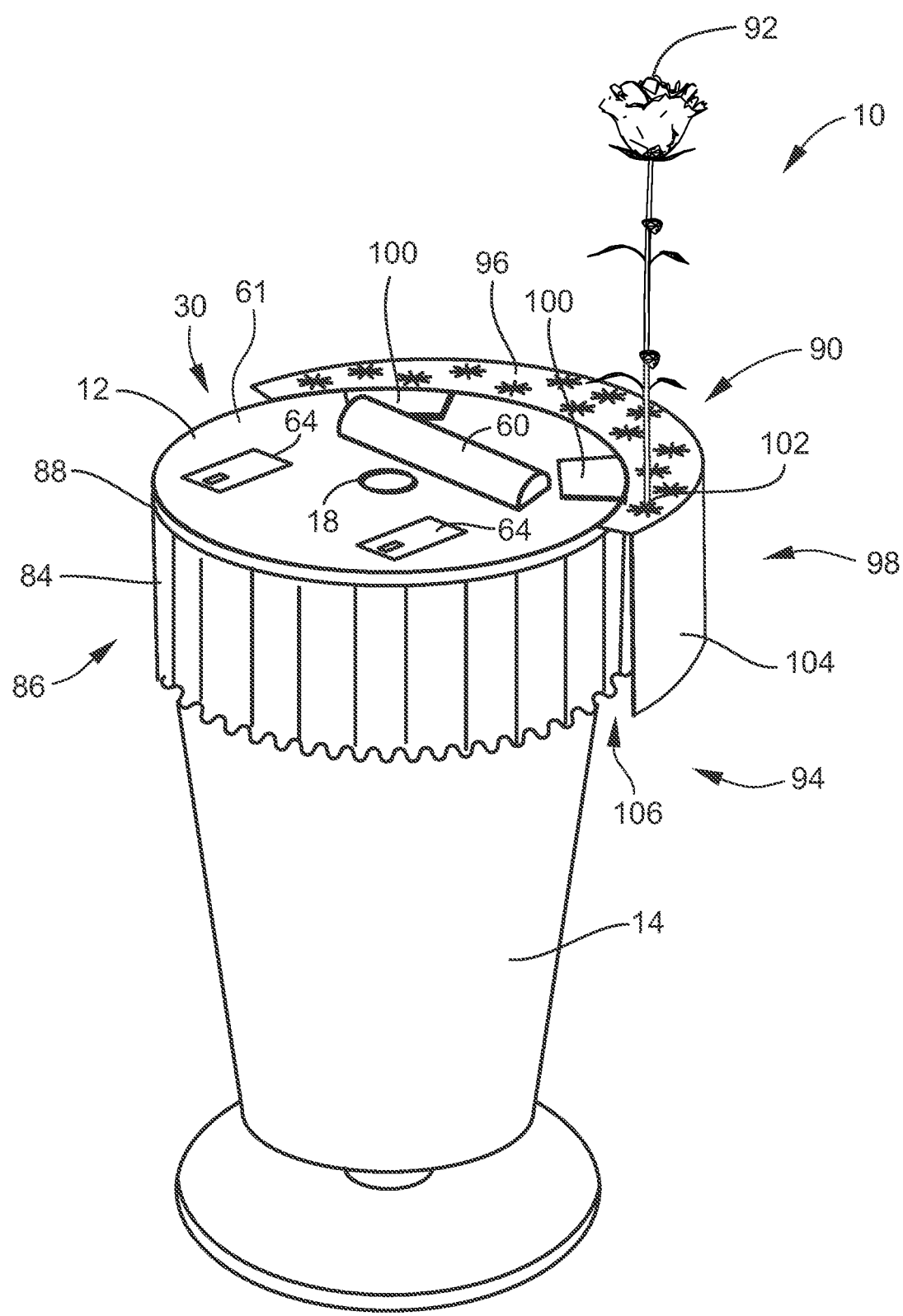
FIG. 13 is a front top perspective view of the memorial vase cover and ornament kit according to select embodiments of the instant disclosure with the flower holder attached on the back side of the vase with one flower inserted into one of the flower holder holes and the outer skirt positioned over the top portion of the memorial vase.
Figure 14:
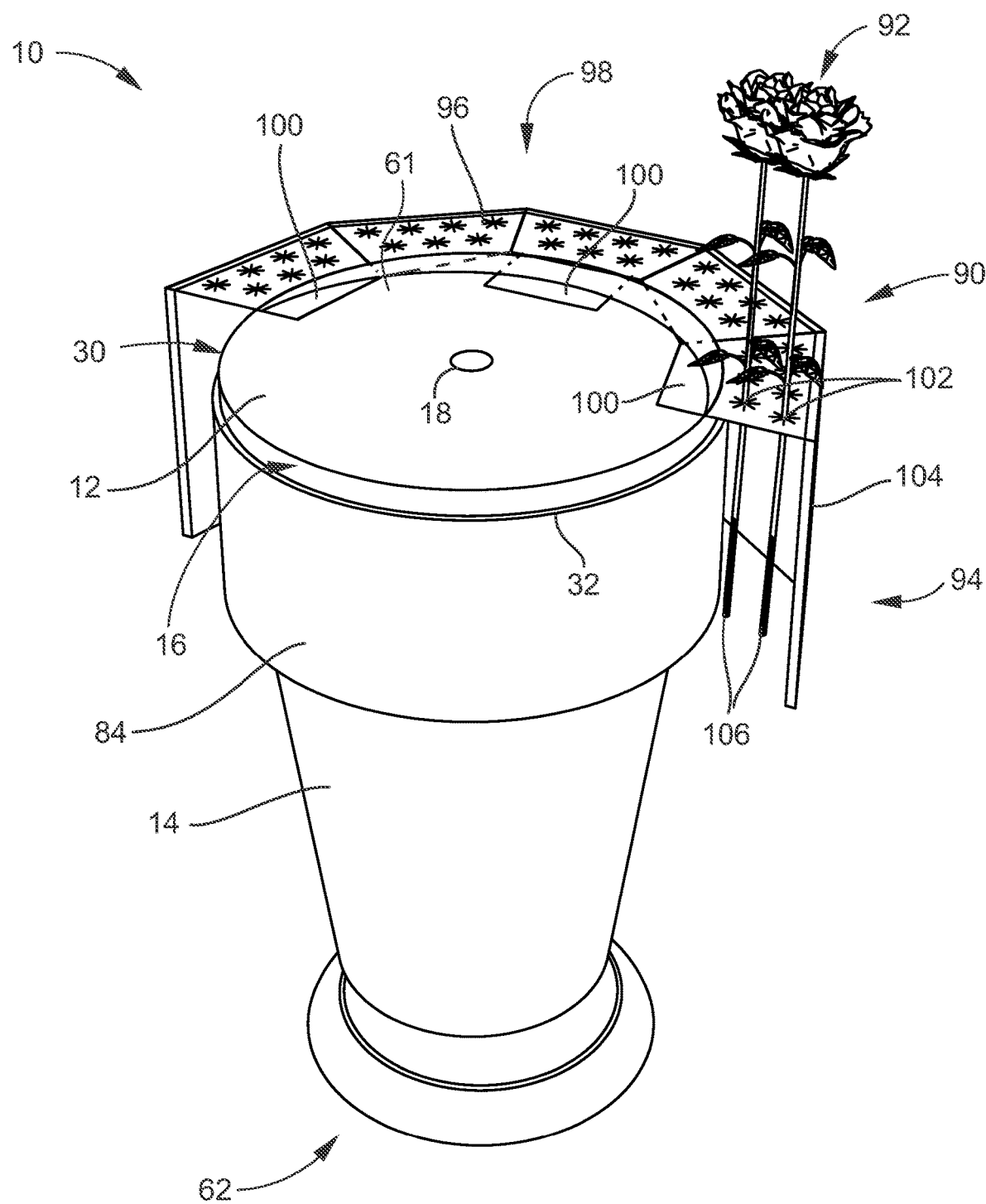
FIG. 14 is a front top perspective view of the memorial vase cover and ornament kit according to select embodiments of the instant disclosure with the flower holder attached on the back side of the vase with two flowers inserted into two of the flower holder holes.
Figure 15:
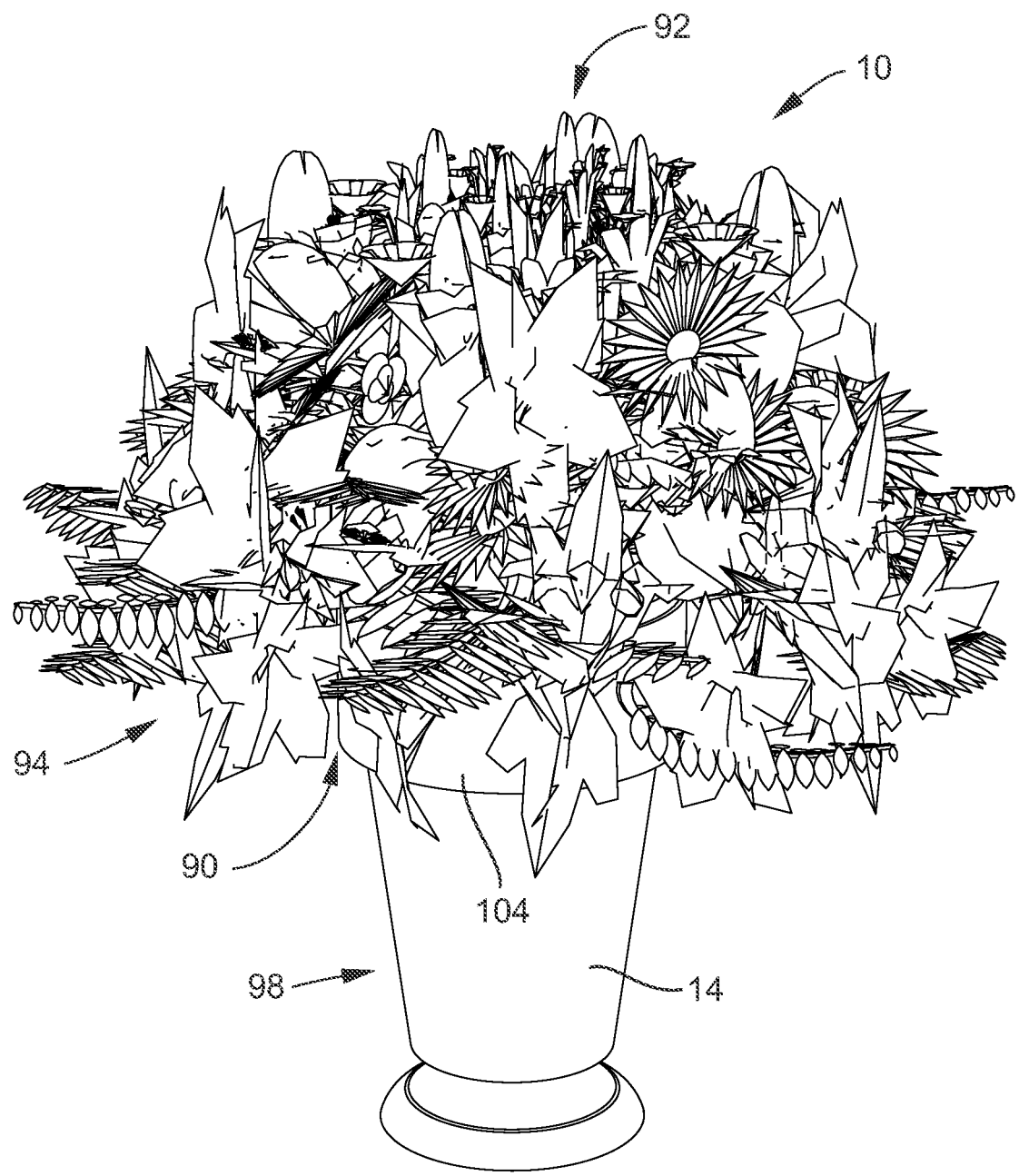
FIG. 15 is a back top perspective view of the memorial vase cover and ornament kit according to select embodiments of the instant disclosure with the flower holder attached on the back side of the vase with a plurality of flowers inserted therein.
Figure 16:
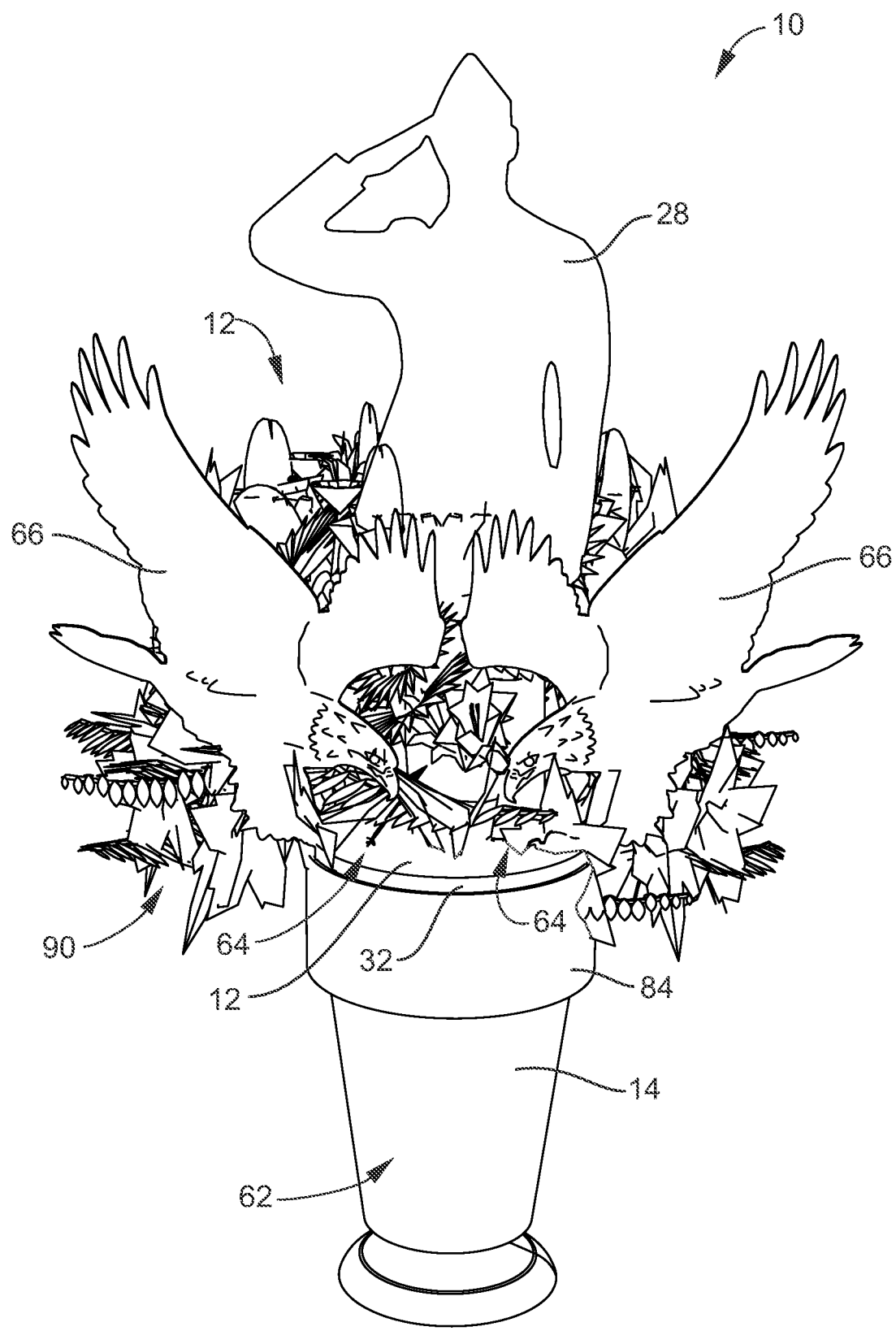
FIG. 16 is a front top perspective view of the memorial vase cover and ornament kit according to select embodiments of the instant disclosure with the base ornament installed on top of the lid, two side ornaments attached on the two side attachments, and the flower holder attached on the back side of the vase, where the base ornament is a soldier design, the two side attachments are eagle designs, and a plurality of flowers are inserted into the flower holder.
Figure 17:
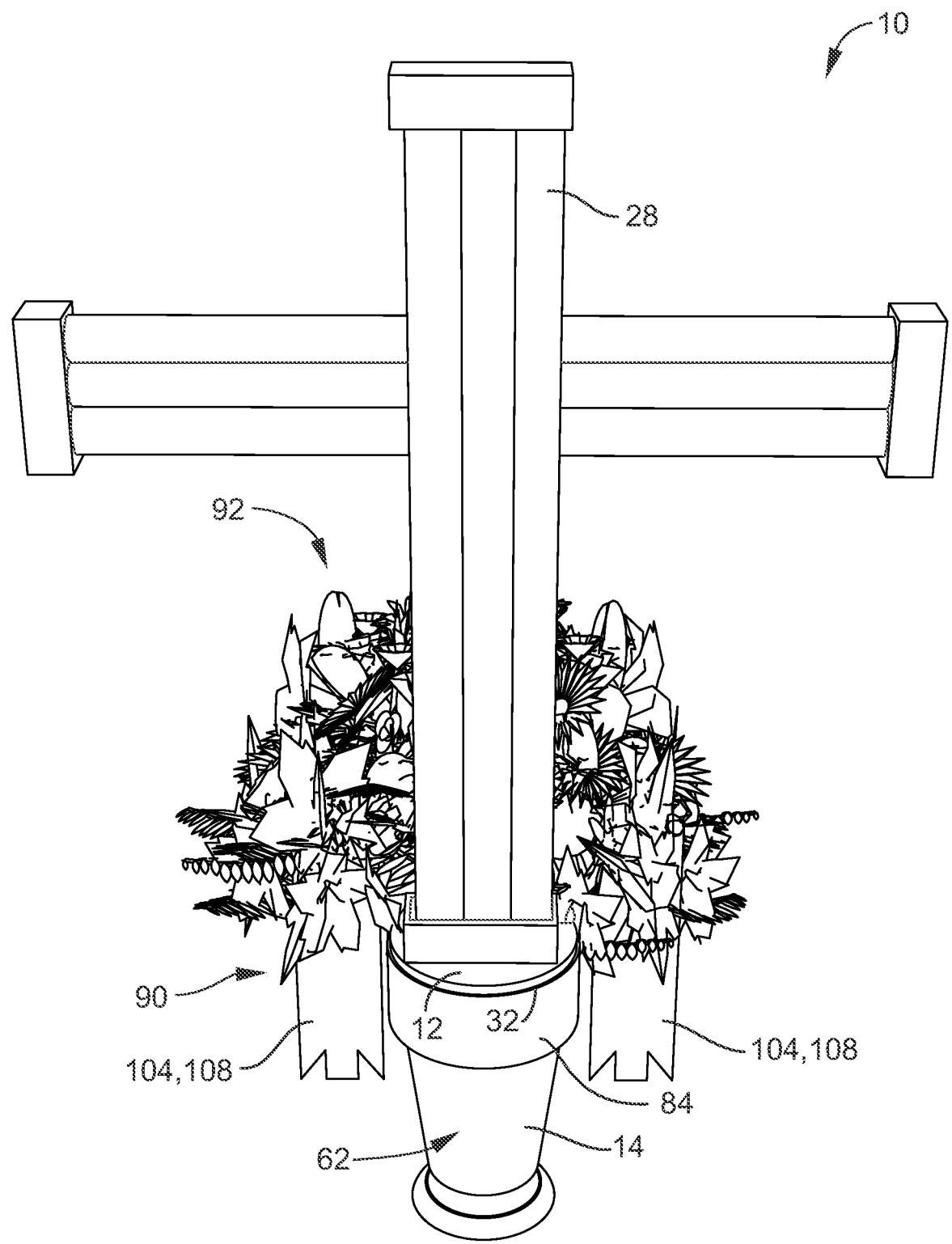
FIG. 17 is a front top perspective view of the memorial vase cover and ornament kit according to select embodiments of the instant disclosure with the base ornament installed on top of the lid, and the flower holder attached on the back side of the vase, where the base ornament is a cross design, and a plurality of flowers are inserted into the flower holder.
Figure 18:
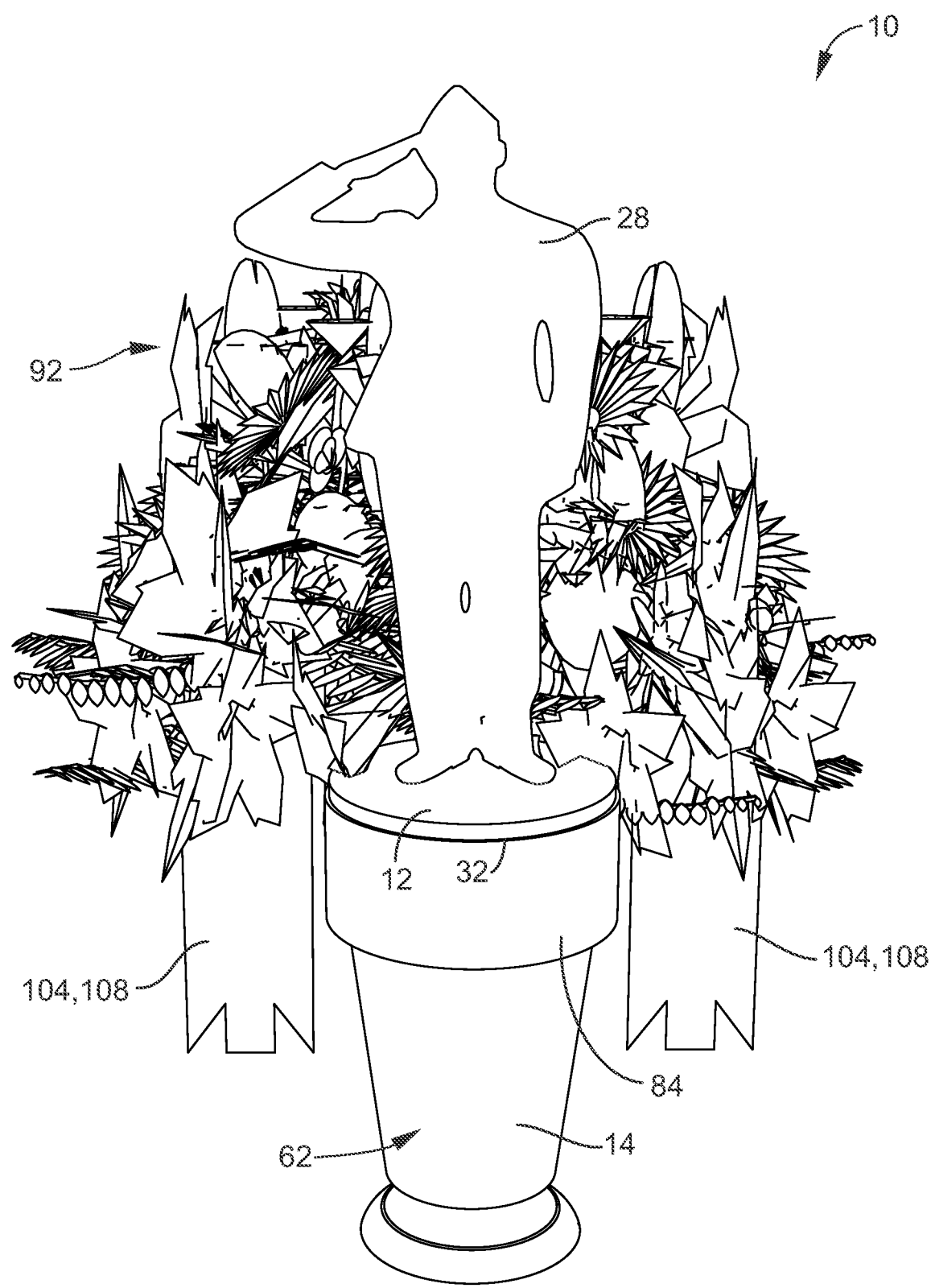
FIG. 18 is a front top perspective view of the memorial vase cover and ornament kit according to select embodiments of the instant disclosure with the base ornament installed on top of the lid, and the flower holder attached on the back side of the vase, where the base ornament is a soldier design, and a plurality of flowers are inserted into the flower holder.

Referring now specifically to FIGS. 1, 8, and 13, orientation projection 60 may be included as a feature of memorial vase cover and ornament kit 10. Orientation projection 60 may be designed and configured to orient and maintain orientation of base ornament 28 to face front 62 of memorial vase 14. Orientation projection 60 may be any device or means for orienting and maintaining orientation of base ornament 28 to face front 62 of memorial vase 14. Orientation projection 60 may be on top surface 61 of lid 12 behind rod 22. As rod 22 may be circular, thus allowing base ornament 28 to rotate thereon via hoops 56, orientation projection 60 on top surface 61 of lid 12 may be configured for orienting base ornament 28 on rod 22 and maintaining the orientation of base ornament 28 to face front 62 of memorial vase 14. Orientation projection 60 may orient base ornament 28 by providing a protrusion or lip for preventing the bottom surface that is resting on lid 12 from rotating. In substitution of orientation projection 60, as best shown in FIG. 21, partial back lip 110 of flower holder 90 may be utilized for orienting base ornament 28.

Figure 9:
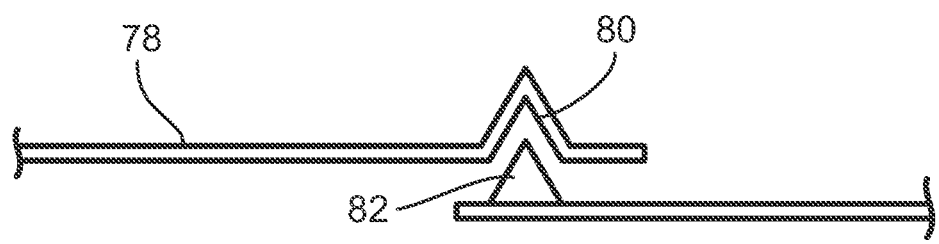
FIG. 9 is a side view of the slide hook tabs for the side attachments of the memorial vase cover and ornament kit according to select embodiments of the instant disclosure.
Figure 10:
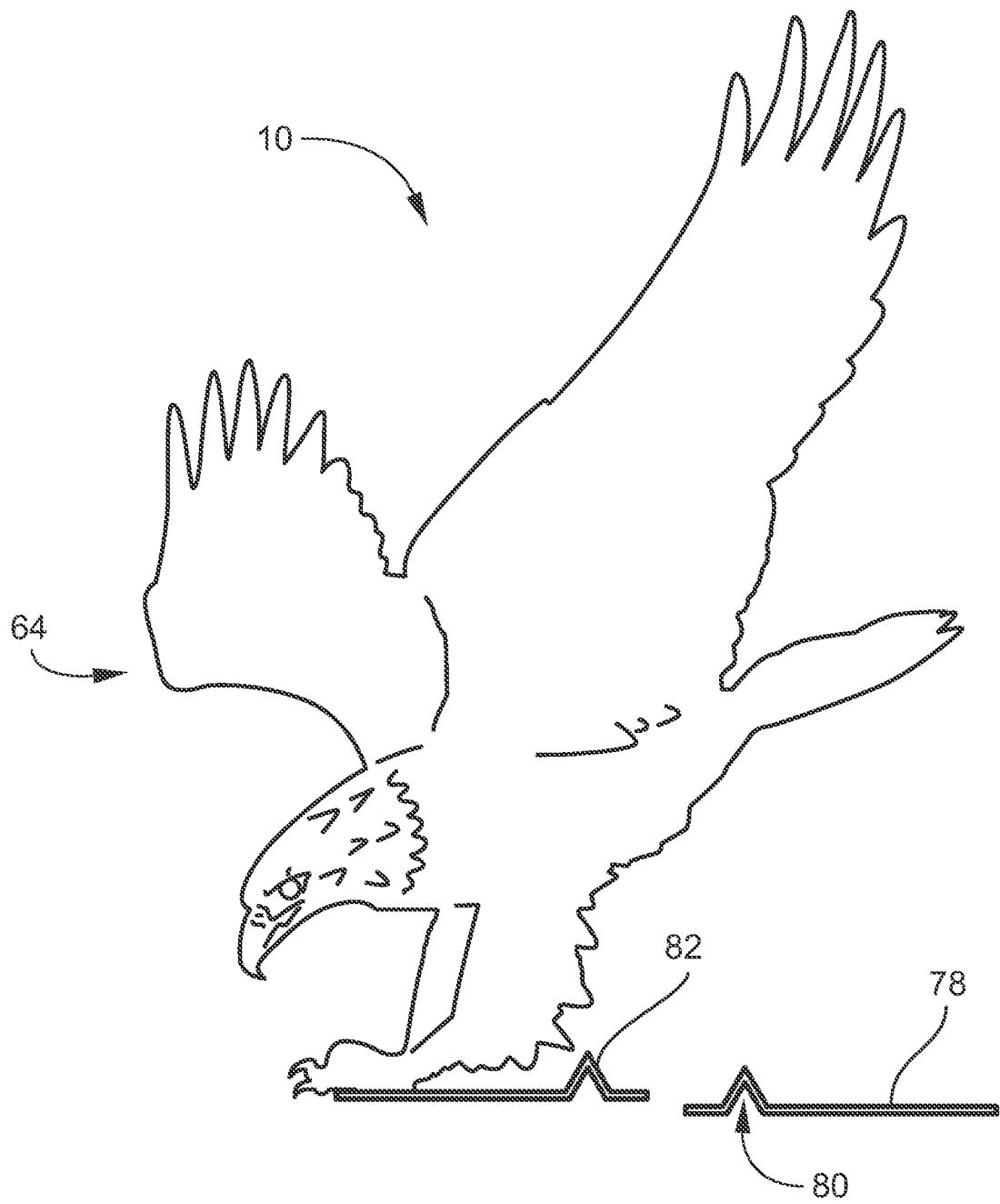
FIG. 10 is a side view of the slide hook tabs for the side attachments of the memorial vase cover and ornament kit according to select embodiments of the instant disclosure showing the side ornament of an eagle design with the protrusion attached thereto for insertion under the indention of the slide hook tab.
Figure 11:
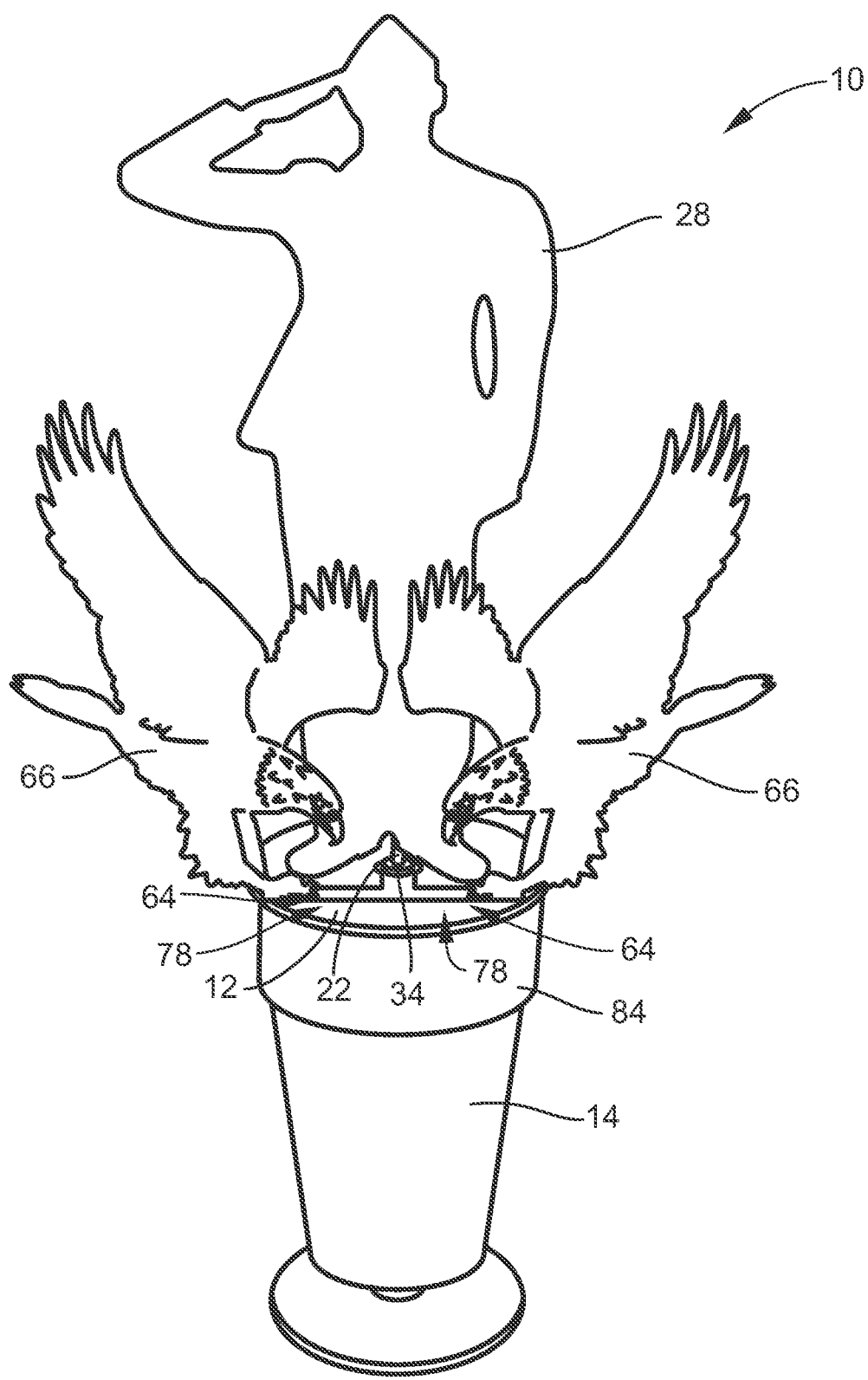
FIG. 11 is a front top perspective view of the memorial vase cover and ornament kit according to select embodiments of the instant disclosure with the base ornament installed on top of the lid and two side ornaments attached on the two side attachments, where the base ornament is a soldier design and the two side attachments are eagle designs.

Referring now specifically to FIGS. 1, 8, 9, 10, 11, 13, and 16, side attachments 64 may be included as a feature of memorial vase cover and ornament kit 10. Side attachments 64 may be for attaching side ornaments 66 on the sides of rod 22. Side attachments 64 may be any devices or means for attaching side ornaments 66 on the sides of rod 22. In addition, side ornaments 66 may be any designs or the like, including, but not limited to, the eagle designs shown in the Figures. Side attachments 64 may be just a single side attachment or multiple side attachments, like two side attachments 68, as shown in the Figures. Side attachment 64 or attachments 64 may be on top surface 61 of lid 12. Each of the at least one side attachments 64 may be configured for attaching side ornament 66. In select embodiments, lid 12 may include two side attachments 68: first side attachment 70 on first side 72 of top surface 61 of lid 12; and second side attachment 74 on second side 76 of top surface 61 of lid 12. As best shown in FIGS. 9 and 10, in other select embodiments, each of the at least one side attachments 64 may include slide hook tab 78. Slide hook tab 78 may be connected to top surface 61 of lid 12 at one end, thereby, allowing slide hook tab 78 to be flexed upwards at its other end. Each of the slide hook tabs 78 may include indention 80 configured to receive protrusion 82 connected to side ornament 66. Wherein, when protrusion 82 of side ornament 66 is inserted under slide hook tab 78 and into indention 80 of slide hook tab 78, slide hook tab 78 may be configured to lock side ornament 66 in place on top surface 61 of lid 12.

Figure 12A:
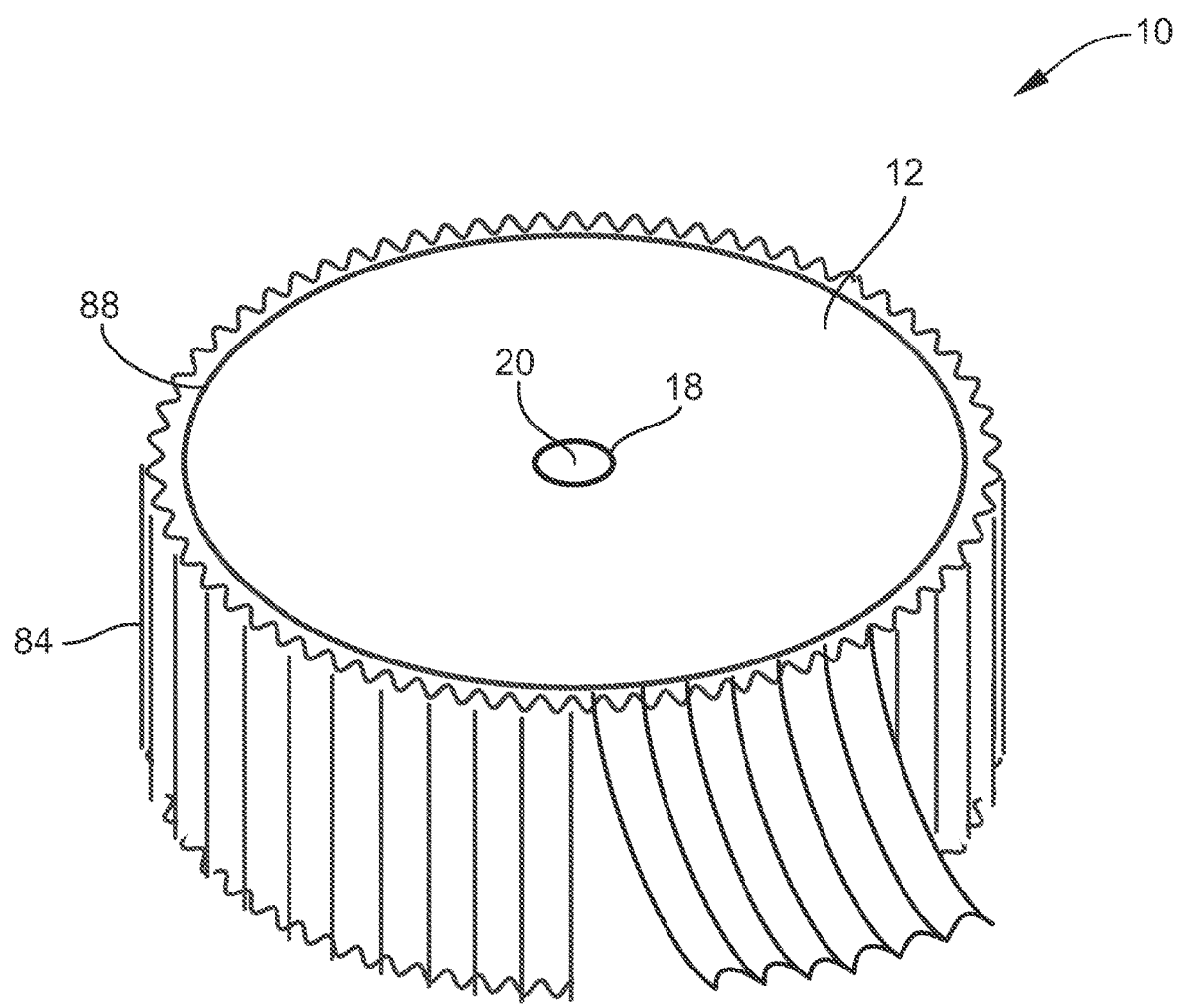
FIG. 12A is a top front perspective view of the outer skirt for the memorial vase cover and ornament kit according to select embodiments of the instant disclosure where the outer skirt is configured to flex or bend to fit the shape of the memorial vase.
Figure 12B:
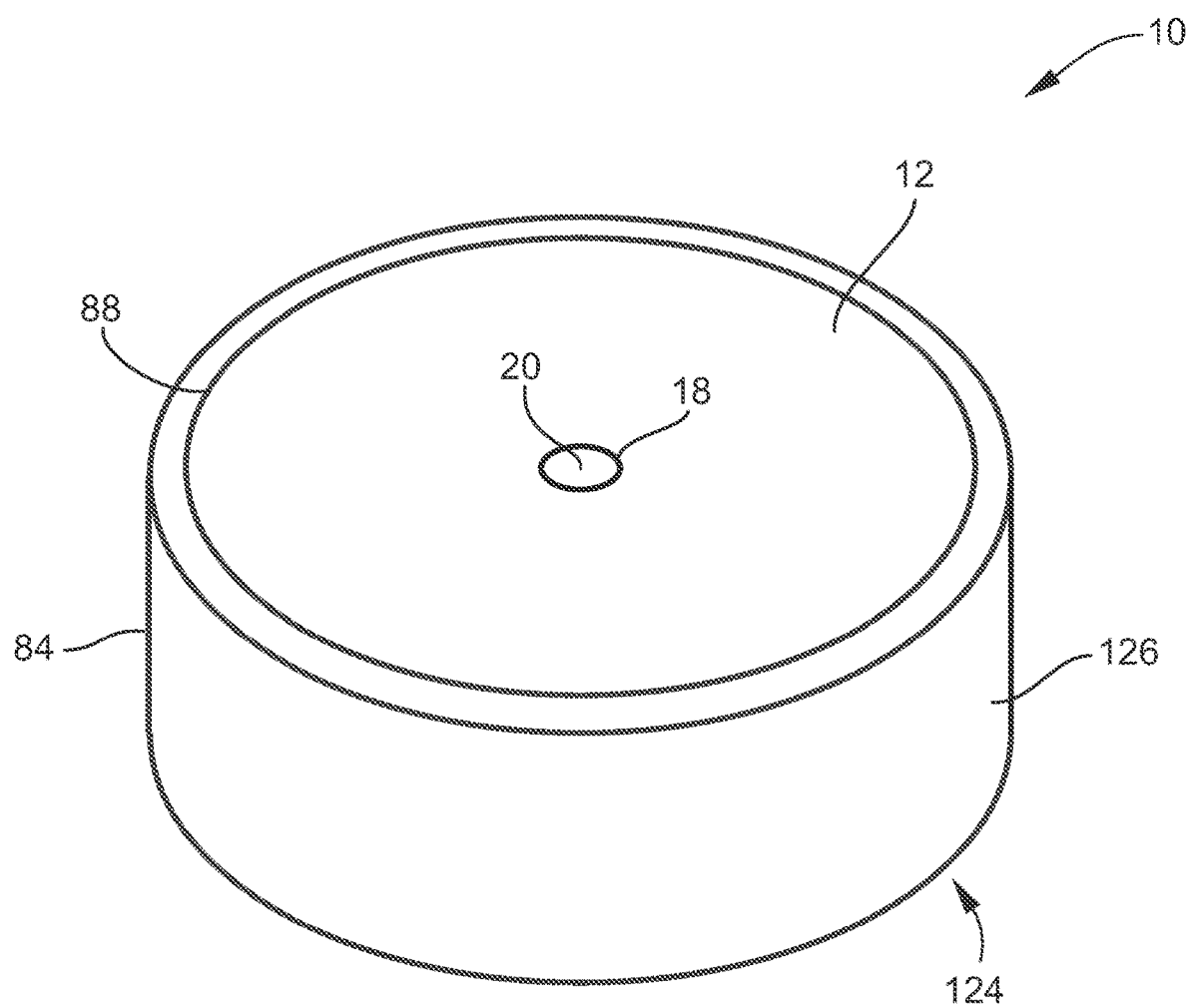
FIG. 12B is a top front perspective view of the outer skirt for the memorial vase cover and ornament kit according to select embodiments of the instant disclosure where the outer skirt has a fixed shape with a flat periphery configured to fit a desired memorial vase.

Referring now specifically to FIGS. 2, 5, 7, 11, 12A, 12B, 13, 14, 16, 17, 18, and 21 outer skirt 84 may be included as a feature of memorial vase cover and ornament kit 10. Outer skirt 84 may be for decorating top portion 86 of memorial vase 14. Outer skirt 84 may also be for securing lid 12 on open top 16 of memorial vase 14. As such, outer skirt 84 may be configured for decorating top portion 86 of memorial vase 14 and/or for securing lid 12 on open top 16 of memorial vase 14. Outer skirt 84 may be attached to and hang down from periphery 88 of lid 12. As shown in FIGS. 2, 5, 7, 11, 12B, 14, 16, 17 18, and 21 in select embodiments, outer skirt 84 may have fixed shaped 124 with flat periphery 126. This fixed shaped 124 may be designed and configured to fit the desired memorial vase 14. As shown in FIGS. 12A and 13, in other select embodiments, outer skirt 84 may also be configured to bend and fit tight around top portion 86 of memorial vase 14. Whereby, outer skirt 84 may be configured to maintain lid 12 in position on open top 16 of memorial vase 14.

Figure 19:
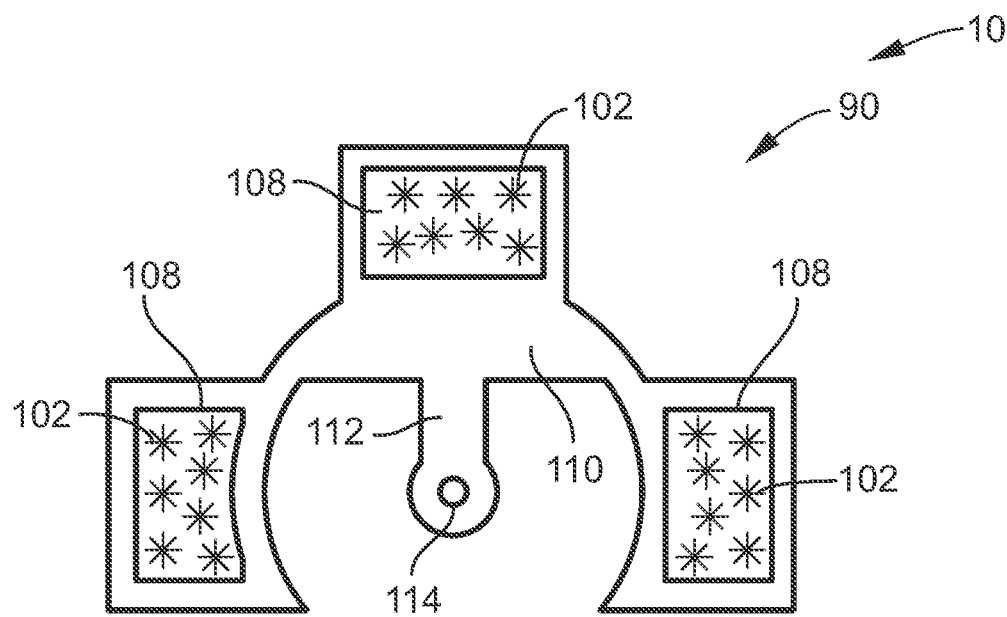
FIG. 19 is a top view of a flower holder for the memorial vase cover and ornament kit according to select embodiments of the instant disclosure.
Figure 20:
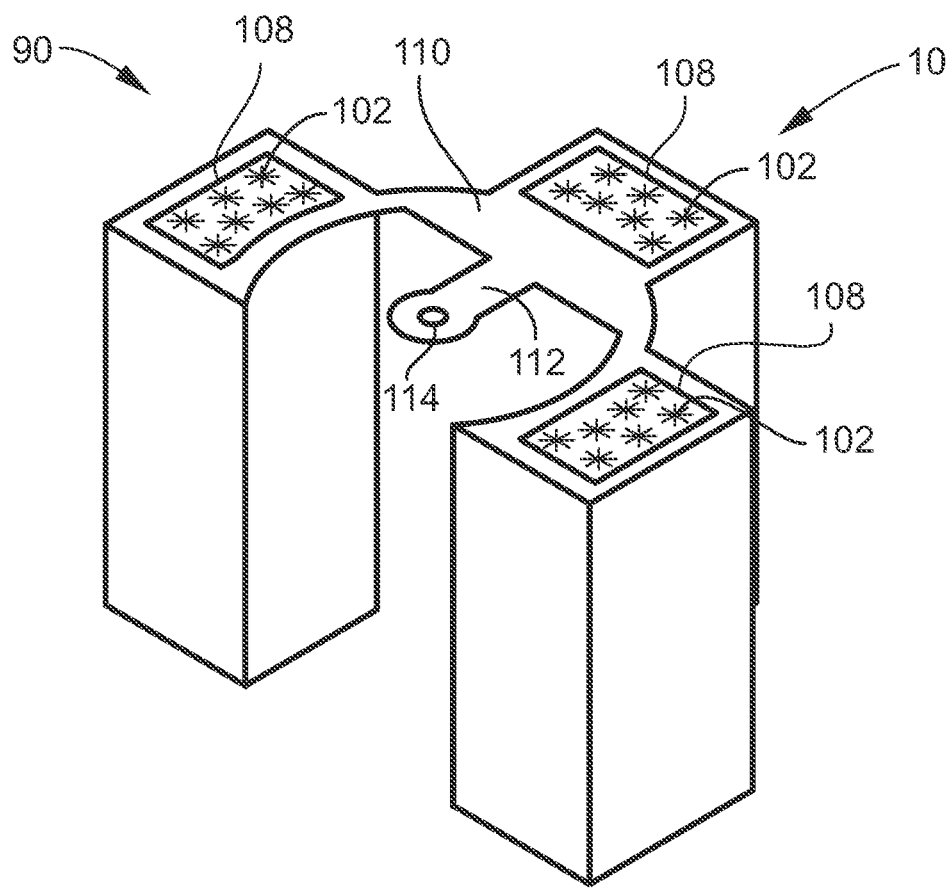
FIG. 20 is a top side perspective view of the flower holder of FIG. 19.

Referring now specifically to FIGS. 13, 14, 15, 16, 17, 18, 19 20, and 21, flower holder 90 may be included as a feature of memorial vase cover and ornament kit 10. Flower holder 90 may be designed and configured to hold flowers 92 on outside 94 of memorial vase 14. Flower holder 90 may include any design or configuration for holding flowers 92 on outside 94 of memorial vase 14. In select embodiments, as shown best in FIGS. 13 and 14, flower holder 90 may include c-shaped surface 96 configured to extend around backside 98 of memorial vase 14. In this c-shaped embodiment, plurality of tab attachments 100 (like magnetic tab attachments) connected to c-shaped surface 96 may be configured to attach c-shaped surface 96 to lid 12. A plurality of flower insert holes 102 may be in c-shaped surface 96 that can be configured to receive and hold a plurality of flowers 92 on outside 94 of memorial vase 14. Stem cover 104 may also be included in this embodiment that hangs down around c-shaped surface 96. Stem cover 104 may be configured for concealing stems 106 of plurality of flowers 92. In other select embodiments, as shown in FIGS. 19, 20, and 21 flower holder 90 may include plurality of receptacles 108. Receptacles 108 may be configured to extend around backside 98 of memorial vase 14 and hold flowers 92 on outside 94 of backside 98 of memorial vase 14 and the sides of memorial vase 14. To position receptacles 108 in place on lid 12, partial back lip portion 110 may be included that is configured to rest on the back side of lip 32 of memorial vase 14. Tongue 112 may also be included to position receptacles 108 in place on lid 12. Tongue 112 may protrude from partial back lip portion 110 and can include flower holder hole 114 configured to receive rod 22 therein. Wherein, flower holder 90 can be attached to memorial vase cover and ornament kit 10 by tongue 112 being inserted onto rod 22 via flower holder hole 114 and slid down and positioned on top of lid 12 where partial back lip portion 110 is resting on the back side of lip 32 of memorial vase 14.

In another aspect, the instant disclosure embraces memorial vase cover and ornament kit 10 in any of the various embodiments and/or combinations of embodiments shown and/or described herein.

Figure 22:
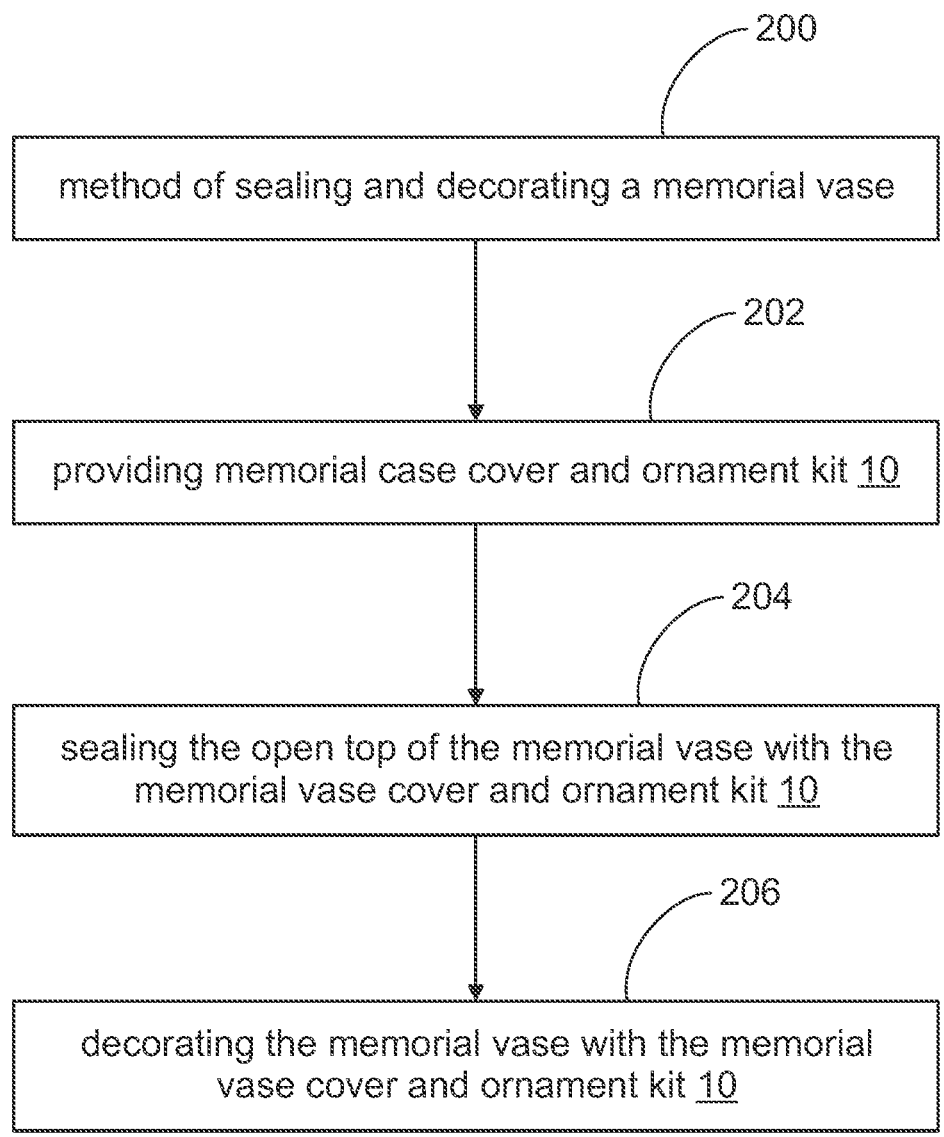
FIG. 22 is a flow chart of a method of sealing and decorating a memorial vase according to select embodiments of the instant disclosure.

Referring now to FIG. 22, in yet another aspect, the instant disclosure embraces method 200 of sealing and decorating memorial vase 14, another vase, or the like. Method 200 of sealing and decorating memorial vase 14 may generally include utilizing memorial vase cover and ornament kit 10 in any of the various embodiments and/or combinations of embodiments shown and/or described herein. As such, method 200 of sealing and decorating memorial vase 14 may include step 202 of providing memorial vase cover and ornament kit 10 in any of the various embodiments and/or combinations of embodiments shown and/or described herein. With the provided memorial vase cover and ornament kit 10, method 200 may further include the steps of: step 204 of sealing open top 16 of memorial vase 14 with memorial vase cover and ornament kit 10 (via lid 12); and/or step 206 of decorating memorial vase 14 with memorial vase cover and ornament kit 10 (like via rod 22, side attachments 64, and/or flower holder 90).

Example Embodiment

Referring to FIG. 3, a side view of rod 22 is shown which can be made of metal 3/16" diameter and 20½" in length. Rod 22 will support lid 12 and placement of ornaments, like base ornament 28, side ornaments 66, and/or flowers 92. Alternative lengths of rod 22 may be utilized and no other device is needed to attach rod. Rod 22 will run from bottom 24 of memorial vase 14 up through lid 12 through rod hole 18 in center 20. Rod 22 will be threaded for rod cap 36 and have a rubber ring or stopper 34 down rod 22 to rest on top of lid 12 for stopping any leaks and sealing rod 22 to lid 12.

Referring now to FIG. 8, a top view of lid 12 is shown. Lid 12 may be made of metal. The top of lid 12 has a diameter of 4½". Outer skirt 84 may have an inside diameter of 4". Lid 12 will have a center opening for 3/16" rod 22 to be placed through lid 12 to bottom 24 of vase 14.

Orientation projection 60 may be a stop wind small rod of 2½" in length and ⅜" in height made from metal. The small stop wind rod of orientation projection 60 will stop movement of base ornament 28 and will be placed behind center rod 22. This orientation projection 60 or small wind stopper will be welded on top of lid 12.

Still referring to FIG. 8, slide attachments 64 made of slide hook tabs 78 may also be made of metal and welded on the top of lid 12. Two slide hook tabs 78 will be welded on top of lid 12 one on each side (72, 76) of lid 12. Slide hook tabs 78 will attach accessories like side ornaments 66 to lid 12 and will allow base ornament 28 to still be placed on center rod 22. Slide hook tabs 78 will be welded on just the back end and the front end left open for the opposite slide tab hook with protrusion 82 to be inserted under the front end and into indention 80 to connect the side ornaments 66 to the top of lid 12, as best shown in FIGS. 9 and 10.

Referring now to FIGS. 12 and 13, a diagram of outer circular skirt 84 is shown that fits vertical around lid 12 and wrapping around outer side of vase 14 about top portion 86. Outer skirt 84 hangs down around lid 1½". Outer skirt 84 will be made of metal with a desired gauge of metal allowing for adjustability to fit various sizes. Outer skirt 84 will have an opening in back of lid 12 with locking system for adjusting from 4⅛" down to 3". An alternative for outer skirt 84 adjusting could be bendable material.

Referring now to FIG. 4, a bottom view or underside view of lid 12 includes 4 to 6 prongs 52 projecting down with the ability to bend around center weight 44. Center weight 44 is shown as a doughnut shaped 46 weight. The doughnut shape 46 of weight 44 on the inside of the backside of lid 12 has a diameter of 2½". Weight 44 will allow for a center opening allowing for the center rod 22 to pass through to bottom 24 of vase 14. The inside diameter of weight 44 is ¾". Between the inside diameter of the outer skirt 84 of lid 12 and the outside diameter of weight 44 should have a clearance of ¾". Weight 44 will allow for protection against wind lifting lid 12 off of memorial vase 14. Weight 44 can be provided with any desired thickness and weight by providing various material and size of weight 44. This will also determine the length of prongs 52 attaching weight 44 to the under side of lid 12.

The disclosed memorial vase cover and ornament kit 10 may be designed and configured with lid 12 to stop water, or other materials, from filling up memorial vase 14 and pushing out other displays such as the common flowers. The common flowers become weather damaged over a short period of time and fade out of their color. No fading and less damage with the disclosed lid/ornaments. Lid 12 will allow for a stronger placement of a display, like base ornament 28, side ornaments 66, flowers 92, or the like, and last for a longer period of time. It will be a wiser investment. The series of ornaments will allow for a more meaningful display of their love one's life. The series will stand tall on the vase and can tell the on looking-by-stander, something special about the deceased's life. Kit 10 set will help in the mowing of the cemetery grounds allowing everything to be secure on the vase. No mess to pick up and trash. There is no standard from cemetery to cemetery and kit 10 with lid 12 could set the standard of displaying and keeping the area clean and respectful. Rod 22 will hold base ornament 28 and allows for the ornament to slide onto rod 22 and rest on the top of lid 12. Removing rod cap 36 and sliding another ornament onto rod 22 can easily change the ornaments. Rod 22 will run all the way to bottom 24 of memorial vase 14 and held by lid 12 in position, like via weight 44, outer skirt 84, or a combination thereof. Rubber stopper 34 or ring will keep rod 22 in position and the rubber seal will keep from any water leaks. Rod cap 36 will be threaded on to rod 22 to keep the ornament from blowing off.

The top of the metal painted lid 12 will fit tightly to vase 14 and support rod 22. Lid 12 has three elements for supporting and displaying ornaments. The main rod 22 in the center and behind the center rod 22 a small rod like a toothpick (orientation projection 60) will support base ornament 28. The small rod of orientation projection 60 will be attached to top 61 of lid 12 and will stop base ornament 28 from blowing from side to side with rod cap 36 to keep the ornament from blowing up or lifted off rod 22. Two slide hook tabs 78 will be on both sides (72, 76) of top of lid 12 and spaced away from center rod 22 allowing for placement of accessory ornaments or side ornaments 66.

Base ornament 28 will have a front and back side 58 with opened attachment rings or hoops 56 welded in the center to attach base ornament 28 to main rod 22. When attached, base ornament 28 will rest on top 61 of lid 12. Side ornaments 66 may be smaller than base ornament 28. Side ornaments 66 can be added or not by utilizing side attachments 64 on top of lid 12. Flower holder 90 may be included as an option to hold flowers on outside 94 of memorial vase 14. Flower holder 90 will allow the user to add flowers 92 around the ornaments from the back of lid 12. Flower holder 90 will be metal and in a shape of a C, allowing it to fit just around the backside 98 of lid 12 and allowing the ornaments to stand on the front side 62. Flowers 92 can be inserted into three projecting panels that will have openings for flower stems. Each panel will have 6 to 10 openings (insert holes 102) for flower stems, much like a straw through a plastic lid. This allows for plenty of flowers around the ornaments while cutting down on the flowers used in most displays. Projecting enclosure 1" to 2", outward from the vase, will support each panel. Flower holder 90 will be attachable and un-attachable as desired by the user. Flower holder 90 can be supported by tab attachments 100 that will run around the trim of lid 12 with Neodymium magnets, which can withstand temps. −30 c and up to 80 c. Flower holder 90 does allow some flowers, while still cutting down on the amount of flowers normally needed for a display, while still keeping clean up at a minimum.

Lid 12 would be made of metal and as one complete piece. No other opening into the top of the lid itself other than the opening for center rod 22. Leaking is a main concern and problem for memorial vases. Rod 22 and lid 12 may be made out of rust proof material.

In sum, memorial vase cover and ornament kit 10 may be designed to give the user a choice other than the flower display and gives the user a unique way to honor their loved one. Kit 10 will come with lid 12, rod 22 with a base ornament 28. If the user still wants some flowers on display they can purchase flower holder 90 made for lid 12. They can place lid 12 on a desired memorial vase 14 and slide base ornament 28 onto rod 22. When they return the display will still be attached and when they want to change for the season or a special day birthday they can easily slide base ornament 28 off and slide another on to rod 22. If they want to keep the base ornament 28, which will be the biggest on lid 12, they can add smaller side ornaments 66 with the slide hook tabs 78, which could be birds or flags etc.

The instant disclosure recognizes the need to have something strong enough to with stand the elements of weather at cemeteries and grave sites. Family members deal with their grief, and in the process, have to deal with seeing their gifts of love thrown all over the place. The disclosed memorial vase cover and ornament kit 10 may be designed to stop the problem and give them an answer that not only saves them money and time but makes the cemetery organized and clean.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A memorial vase cover and ornament kit comprising:
a lid configured to fit on a memorial vase and seal an open top of the memorial vase, the lid having a rod hole through a center of the lid configured to receive a rod;
the rod being configured to extend from approximate a bottom of the memorial vase, through the rod hole in the lid positioned on the open top of the memorial vase and upwards above the lid for a set distance to hold a base ornament on the lid;

a weight positioned on the rod below the lid, the weight being configured to securely position the lid on top of the open top of the memorial vase;

wherein the weight has a doughnut shape with a tapered bottom edge, the tapered bottom edge of the doughnut shape is configured to allow the weight to be positioned on a tapered interior of the memorial vase;

wherein the weight is positioned below the lid via a plurality of prongs, the prongs are attached to a bottom surface of the lid, extend around the weight, and attach to the rod below the weight, where the prongs are configured for holding the weight below the lid; and wherein, the memorial vase cover and ornament kit is configured to cover and seal the open top of the memorial vase and to allow the memorial vase to be decorated with the base ornament.

2. The memorial vase cover and ornament kit of claim 1, wherein the lid having a circular shape and the open top of the memorial vase having a lip, where the circular shape is sized to position the lid on the lip of the open top of the memorial vase.

3. The memorial vase cover and ornament kit of claim 1, wherein the rod hole including a rubber stopper configured to seal the rod to the rod hole in the lid.

4. The memorial vase cover and ornament kit of claim 1, wherein the rod including a rod cap configured to be attached to a top end of the rod, the rod cap being configured to keep the base ornament on the rod.

5. The memorial vase cover and ornament kit of claim 4, wherein the rod including a threaded portion at the top end of the rod and the rod cap including a threaded interior configured to attach the rod cap to the threaded portion at the top end of the rod, whereby the rod cap may be screwed on and off of the top end of the rod.

6. The memorial vase cover and ornament kit of claim 1, wherein the base ornament including:
a plurality of hoops attached to a back side of the base ornament, the plurality of hoops are configured and shaped to go around the rod and position the base ornament on top of the lid; or
a front member, a back member, and at least one connecting member connected between the front member and the back member, each of the at least one connecting members including a connecting member hole configured to receive the rod for positioning the base ornament on top of the lid.

7. The memorial vase cover and ornament kit of claim 6, wherein the lid including an orientation projection on a top surface of the lid behind the rod, the orientation projection on the top surface of the lid is configured for orienting the base ornament on the rod and maintaining a front orientation of the base ornament to face a front of the memorial vase.

8. The memorial vase cover and ornament kit of claim 1, wherein the lid including at least one side attachment on a top surface of the lid, each of the at least one side attachments is configured for attaching a side ornament.

9. The memorial vase cover and ornament kit of claim 8, wherein the lid including two side attachments, a first side attachment on a first side of the top surface of the lid, and a second side attachment on a second side of the top surface of the lid.

10. The memorial vase cover and ornament kit of claim 8, wherein each of the at least one side attachments including a slide hook tab connected to the top surface of the lid, each of the slide hook tabs including an indention configured to receive a protrusion connected to the side ornament, wherein, when the protrusion of the side ornament is inserted under the slide hook tab and into the indention of the slide hook tab, the slide hook tab is configured to lock the side ornament in place on the top surface of the lid.

11. The memorial vase cover and ornament kit of claim 1 further comprising an outer skirt, the outer skirt is configured for decorating a top portion of the memorial vase, the outer skirt hanging down from a periphery of the lid.

12. The memorial vase cover and ornament kit of claim 11, wherein:
the outer skirt includes a fixed shaped with a flat periphery, wherein the fixed shape is designed and configured to fit the memorial vase;
the outer skirt is configured to bend and fit tight around the top portion of the memorial vase, whereby the outer skirt is configured to maintain the lid in position on the open top of the memorial vase.

13. The memorial vase cover and ornament kit of claim 1 further comprising a flower holder, the flower holder is configured to hold flowers on an outside of the memorial vase.

14. The memorial vase cover and ornament kit of claim 13, wherein the flower holder including:
a c-shaped surface configured to extend around a back side of the memorial vase;
a plurality of tab attachments connected to the c-shaped surface configured to attach the c-shaped surface to the lid;
a plurality of insert holes in the c-shaped surface configured to receive and hold a plurality of the flowers on the outside of the memorial vase; and
a stem cover that hangs down around the c-shaped surface configured for concealing stems of the plurality of flowers.

15. The memorial vase cover and ornament kit of claim 13, wherein the flower holder including:
a plurality of receptacles configured to extend around a back side of the memorial vase and hold the flowers, each of the plurality of receptacles including a plurality of insert holes configured to receive and hold a plurality of the flowers inside of the receptacle;
a partial back lip portion configured to rest on the back side of the memorial vase;
a tongue protruding from the partial lip portion, the tongue including a flower holder hole configured to receive the rod;
wherein, the tongue can be inserted onto the rod via the flower holder hole and positioned on top of the lid where the partial back lip portion is resting on the back side of the memorial vase.

16. A memorial vase cover and ornament kit comprising:
a lid configured to fit on a memorial vase and seal an open top of the memorial vase, the lid having a rod hole through a center of the lid configured to receive a rod;
the rod being configured to extend from approximate a bottom of the memorial vase, through the rod hole in the lid positioned on the open top of the memorial vase and upwards above the lid for a set distance to hold a base ornament on the lid;
a flower holder, the flower holder is configured to hold flowers on the outside of the memorial vase, wherein:
the flower holder including:
a plurality of receptacles configured to extend around a back side of the memorial vase and hold the flowers;

a partial back lip portion configured to rest on the back side of the memorial vase;
a tongue protruding from the partial lip portion, the tongue including a flower holder hole configured to receive the rod;
wherein, the tongue can be inserted onto the rod via the flower holder hole and positioned on top of the lid where the partial back lip portion is resting on the back side of the memorial vase;

wherein, the memorial vase cover and ornament kit is configured to cover and seal the open top of the memorial vase and to allow the memorial vase to be decorated with the base ornament.

17. A memorial vase cover and ornament kit comprising:

a lid configured to fit on a memorial vase and seal an open top of the memorial vase, the lid having a rod hole through a center of the lid configured to receive a rod, the lid including:
at least one side attachment on a top surface of the lid, each of the at least one side attachments is configured for attaching a side ornament;
wherein each of the at least one side attachments including a slide hook tab connected to the top surface of the lid, each of the slide hook tabs including an indention configured to receive a protrusion connected to the side ornament, wherein, when the protrusion of the side ornament is inserted under the slide hook tab and into the indention of the slide hook tab, the slide hook tab is configured to lock the side ornament in place on the top surface of the lid the rod being configured to extend from approximate a bottom of the memorial vase, through the rod hole in the lid positioned on the open top of the memorial vase and upwards above the lid for a set distance to hold a base ornament on the lid;

wherein, the memorial vase cover and ornament kit is configured to cover and seal the open top of the memorial vase and to allow the memorial vase to be decorated with the base ornament.

* * * * *